US012731503B2

(12) United States Patent
Mathew et al.

(10) Patent No.: US 12,731,503 B2
(45) Date of Patent: Sep. 8, 2026

(54) AUTOMATED ALIGNMENT OF EDUCATION CONTENT

(71) Applicant: Renaissance Learning, Inc., Wisconsin Rapids, WI (US)

(72) Inventors: Ajay Mathew, Vancouver, WA (US); Julianne Robar, Lac des Loups (CA); Zecheng Chang, Long Island City, NY (US); Bruce Bray, Camas, WA (US); Jon Medin, Nerstrand, MN (US); Selvedin Alic, Eagan, MN (US); Robert Zieroth, Wisconsin Rapids, WI (US); Eric Stickney, Waunakee, WI (US); Eric Swanson, Waunakee, WI (US); Jon Stelman, Brooklyn, NY (US)

(73) Assignee: Renaissance Learning, Inc., Wisconsin Rapids, WI (US)

( * ) Notice: Subject to any disclaimer, the term of this patent is extended or adjusted under 35 U.S.C. 154(b) by 238 days.

(21) Appl. No.: 18/389,715

(22) Filed: Dec. 19, 2023

(65) Prior Publication Data

US 2024/0233565 A1 Jul. 11, 2024

Related U.S. Application Data

(60) Provisional application No. 63/478,568, filed on Jan. 5, 2023.

(51) Int. Cl.
*G09B 5/06* (2006.01)

(52) U.S. Cl.
CPC .................................... *G09B 5/065* (2013.01)

(58) Field of Classification Search
CPC ...................................................... G09B 5/065
See application file for complete search history.

(56) References Cited

U.S. PATENT DOCUMENTS 3,245,157 A 4/1966 Laviana
4,764,120 A 8/1988 Griffin et al.
(Continued)

FOREIGN PATENT DOCUMENTS

EP 0697773 A2 2/1996
EP 0843432 A2 5/1998
(Continued)

OTHER PUBLICATIONS

Lu, Min, "Research on Content and Mode Recommendation of Humanistic Quality Education for Science and Engineering Students Based on Collaborative Filtering Algorithm." 2021 IEEE Conference on Telecommunications, Optics and Computer Science (TOCS) (Year: 2021), 9 pgs.
(Continued)

*Primary Examiner* — Steve Rowland
(74) *Attorney, Agent, or Firm* — PATENT LAW WORKS LLP

(57) ABSTRACT

Some embodiments of a system and methods that automate and facilitate the alignment of educational content from diverse sources are disclosed. This system and methods facilitate and enhance automated content connections. They are configured to create models that automate and facilitate the alignment of educational content from diverse sources, ranging from specific questions to instructional plans. These may be aligned independently or through a knowledge graph. This alignment includes jurisdiction dependent definitions of educational goals, such as standards and learning objectives. Model inputs include one content set being assimilated and associated metadata persisted in a data store where another content set can be added for comparison. Content is evaluated for perfect text matches and also imperfect matches that are close in semantic meaning. The system's algorithm compares multiple products, their edu- (Continued)

900 cation units of information, and academic standards as designated between various agencies. The results are provided in a user interface.

20 Claims, 11 Drawing Sheets

(56) References Cited

U.S. PATENT DOCUMENTS 5,002,491 A 3/1991 Abrahamson et al.
5,273,437 A 12/1993 Caldwell et al.
5,379,221 A 1/1995 Schulter et al.
5,540,589 A 7/1996 Waters
D377,339 S 1/1997 Beruscha et al.
RE35,449 E 2/1997 Derks
5,697,789 A 12/1997 Sameth et al.
5,724,357 A 3/1998 Derks
5,735,693 A 4/1998 Groiss
5,823,788 A 10/1998 Lemelson et al.
5,870,709 A 2/1999 Bernstein
5,885,083 A 3/1999 Ferrell
D408,381 S 4/1999 Nelson et al.
6,021,119 A 2/2000 Derks et al.
6,077,085 A 6/2000 Parry et al.
6,120,297 A 9/2000 Morse, III et al.
D431,562 S 10/2000 Bhatia et al.
6,178,308 B1 1/2001 Bobrow et al.
D437,314 S 2/2001 DeLeon
6,224,383 B1 5/2001 Shannon
D447,729 S 9/2001 Song et al.
D447,740 S 9/2001 Johansson
D448,026 S 9/2001 Nicklos et al.
D448,375 S 9/2001 Walters et al.
6,305,942 B1 10/2001 Block et al.
6,328,569 B1 12/2001 Jenkins et al.
D452,863 S 1/2002 Madsen et al.
6,343,935 B1 2/2002 Clements
D469,763 S 2/2003 Searby et al.
D480,716 S 10/2003 Saikawa et al.
D481,037 S 10/2003 Searby
6,665,000 B1 12/2003 Buehler et al.
6,732,148 B1 5/2004 Estrada et al.
6,807,395 B2 10/2004 Iwazaki et al.
D501,643 S 2/2005 Strand et al.
6,895,213 B1 5/2005 Ward
6,907,546 B1 6/2005 Haswell et al.
7,052,278 B2 5/2006 Johnson et al.
D523,854 S 6/2006 Rinna et al.
7,360,158 B1 4/2008 Beeman
RE40,459 E 8/2008 Hawkins et al.
7,415,537 B1 8/2008 Maes
7,502,855 B2 3/2009 Swanson et al.
7,698,367 B2 4/2010 Mason et al.
7,761,591 B2 7/2010 Graham
7,788,647 B2 8/2010 Martin et al.
8,060,489 B1 11/2011 Raman et al.
8,696,365 B1 4/2014 Bainbridge et al.
9,251,130 B1 2/2016 Lynnes et al.
10,015,213 B2 7/2018 Goldman et al.
10,825,348 B2 11/2020 Angel et al.
11,250,721 B2 2/2022 Angel et al.
11,527,172 B2 12/2022 Goldman et al.
11,862,041 B2 1/2024 Angel et al.
12,094,018 B1 9/2024 O'Malley
2001/0003040 A1 6/2001 Spector
2001/0018703 A1 8/2001 Miyazawa et al.
2002/0107726 A1 8/2002 Torrance et al.
2002/0192631 A1 12/2002 Weir et al.
2003/0016732 A1 1/2003 Miklos et al.
2003/0050927 A1 3/2003 Hussam
2003/0073065 A1 4/2003 Riggs
2003/0074320 A1 4/2003 Riggs
2003/0095102 A1 5/2003 Kraft et al.
2003/0153263 A1 8/2003 Glass et al.
2003/0153321 A1 8/2003 Glass et al.
2003/0153347 A1 8/2003 Glass et al.
2003/0198932 A1 10/2003 Stuppy
2003/0236891 A1 12/2003 Glass et al.
2004/0009461 A1 1/2004 Snyder
2004/0018479 A1 1/2004 Pritchard et al.
2004/0027377 A1 2/2004 Hays et al.
2004/0030697 A1 2/2004 Cochran et al.
2004/0033478 A1 2/2004 Knowles et al.
2004/0034816 A1 2/2004 Richard
2004/0072136 A1 4/2004 Roschelle et al.
2004/0115608 A1 6/2004 Meyer et al.
2004/0117354 A1 6/2004 Azzaro et al.
2004/0127208 A1 7/2004 Nair et al.
2004/0161728 A1 8/2004 Benevento
2004/0203563 A1 10/2004 Menard
2004/0205818 A1 10/2004 Saruhashi et al.
2004/0209634 A1 10/2004 Hrastar
2004/0219493 A1 11/2004 Phillips
2004/0229642 A1 11/2004 Derks et al.
2004/0248074 A1 12/2004 Hoyashita et al.
2005/0003338 A1 1/2005 Norcott et al.
2005/0070294 A1 3/2005 Lyle et al.
2005/0086261 A1 4/2005 Mammone
2005/0223315 A1 10/2005 Shimizu et al.
2005/0245295 A1 11/2005 Lee et al.
2005/0282535 A1 12/2005 Chmaytelli et al.
2005/0283723 A1 12/2005 Fish
2005/0287981 A1 12/2005 Hill
2006/0014129 A1* 1/2006 Coleman .................. G09B 7/02
434/322
2006/0057550 A1 3/2006 Sahashi
2006/0111103 A1 5/2006 Jeong et al.
2006/0183477 A1 8/2006 Bocking et al.
2006/0189311 A1 8/2006 Cromer et al.
2006/0204944 A1 9/2006 Preskill
2006/0294216 A1 12/2006 Swanson et al.
2007/0196808 A1 8/2007 Call
2008/0005101 A1 1/2008 Chandra
2008/0016091 A1 1/2008 Chandra
2008/0027933 A1 1/2008 Hussam
2008/0052754 A1 2/2008 Iga
2008/0131863 A1 6/2008 Stuppy
2008/0168146 A1 7/2008 Fletcher
2008/0270357 A1 10/2008 Golovchinsky
2008/0288862 A1 11/2008 Smetters et al.
2009/0282087 A1 11/2009 Muller et al.
2009/0287646 A1 11/2009 Maciocci
2009/0319910 A1 12/2009 Escapa et al.
2010/0092095 A1 4/2010 King et al.
2010/0151431 A1 6/2010 Miller
2010/0262659 A1 10/2010 Christiansen et al.
2010/0287236 A1 11/2010 Amento et al.
2010/0306698 A1 12/2010 Sellers et al.
2010/0318893 A1 12/2010 Matthews et al.
2011/0035329 A1 2/2011 Delli Santi et al.
2011/0083090 A1 4/2011 Gwiazda et al.
2011/0117534 A1 5/2011 Berger
2011/0129808 A1 6/2011 Srivastava
2011/0175855 A1 7/2011 Youn et al.
2011/0246574 A1 10/2011 Lento et al.
2011/0264649 A1 10/2011 Hsiao et al.
2012/0036423 A1 2/2012 Haynes et al.
2012/0109836 A1 5/2012 Chen et al.
2012/0151351 A1 6/2012 Kilroy et al.
2012/0244510 A1 9/2012 Watkins, Jr.
2012/0324392 A1 12/2012 Mbenkum et al.
2012/0329029 A1 12/2012 Rauta
2013/0013812 A1 1/2013 Kessel et al.
2013/0019175 A1 1/2013 Kotler et al.
2013/0040277 A1 2/2013 Linton et al.
2013/0042007 A1 2/2013 Linton et al.
2013/0047115 A1 2/2013 Migos et al.
2013/0104028 A1 4/2013 Murray et al.
2013/0111363 A1 5/2013 Linton
2013/0189666 A1 7/2013 Nolasco
2013/0198273 A1 8/2013 Vago et al.
2013/0275156 A1* 10/2013 Kinkaid .................. G09B 5/12
705/3
2013/0295535 A1 11/2013 Levy et al.

(56) References Cited

U.S. PATENT DOCUMENTS

| | | | | |
|---|---|---|---|---|
| 2014/0006517 | A1 | 1/2014 | Hsiao et al. | |
| 2014/0011180 | A1 | 1/2014 | Tomaziefski | |
| 2014/0038163 | A1 | 2/2014 | Karpoff et al. | |
| 2014/0068507 | A1 | 3/2014 | Nam et al. | |
| 2014/0101527 | A1 | 4/2014 | Suciu | |
| 2014/0101780 | A1 | 4/2014 | Zuber | |
| 2014/0108921 | A1 | 4/2014 | Chen et al. | |
| 2014/0162243 | A1 | 6/2014 | Lamkin | |
| 2014/0184531 | A1 | 7/2014 | Demiya | |
| 2014/0210860 | A1 | 7/2014 | Caissy | |
| 2014/0234824 | A1 | 8/2014 | Schepman et al. | |
| 2014/0242565 | A1 | 8/2014 | Abts | |
| 2014/0310305 | A1 | 10/2014 | Christiansen et al. | |
| 2014/0317488 | A1 | 10/2014 | Lutz | |
| 2015/0058336 | A1 | 2/2015 | Davis | |
| 2015/0058716 | A1 | 2/2015 | Boothman et al. | |
| 2015/0187225 | A1 | 7/2015 | Worsley | |
| 2015/0212707 | A1 | 7/2015 | Norwood | |
| 2015/0220227 | A1 | 8/2015 | Landau | |
| 2015/0286636 | A1 | 10/2015 | Elkhou et al. | |
| 2015/0350151 | A1 | 12/2015 | Graham et al. | |
| 2015/0381722 | A1 | 12/2015 | Lam et al. | |
| 2016/0071424 | A1 | 3/2016 | Harney et al. | |
| 2016/0224896 | A1 | 8/2016 | Pinel | |
| 2017/0076620 | A1 | 3/2017 | Thompsen Primo | |
| 2018/0137125 | A1* | 5/2018 | Vittorio | G06F 16/9558 |
| 2018/0247549 | A1 | 8/2018 | Martin | |
| 2019/0087414 | A1 | 3/2019 | Narayanan | |
| 2020/0090536 | A1 | 3/2020 | Xiong | |
| 2020/0258420 | A1 | 8/2020 | Kurani | |
| 2020/0287984 | A1* | 9/2020 | Walsh | G06F 16/9566 |
| 2020/0302296 | A1* | 9/2020 | Miller | G09B 5/00 |
| 2020/0311159 | A1* | 10/2020 | Ahlstrom | G06F 16/955 |
| 2021/0118317 | A1 | 4/2021 | Angel | |
| 2022/0156468 | A1* | 5/2022 | Kim | G06F 40/237 |
| 2022/0301087 | A1 | 9/2022 | Covell | |
| 2022/0335848 | A1* | 10/2022 | Morley | G09B 5/02 |
| 2022/0350809 | A1 | 11/2022 | Bradley | |
| 2025/0358130 | A1* | 11/2025 | Broggi | G06Q 10/10 |

FOREIGN PATENT DOCUMENTS

| | | | |
|---|---|---|---|
| EP | 1337127 | A1 | 8/2003 |
| EP | 1351145 | A1 | 10/2003 |
| EP | 1427228 | A2 | 6/2004 |
| GB | 2375014 | A | 10/2002 |
| GB | 2587094 | A | 3/2021 |
| WO | 9806210 | A1 | 2/1998 |
| WO | 2004031488 | A2 | 4/2004 |
| WO | 2005039146 | A2 | 4/2005 |

OTHER PUBLICATIONS

Understanding TCP/IP, Cisco Internetworking Basics (2002) Cisco Systems, Inc, 7 pgs.

Akahane-Yamada, R., et al. "Does Training in Speech Perception Modify Speech Production" Proceeding of Fourth International Conference on Spoken Language Processing. ICSLP 96, vol. 2, 1996, pp. 606-609 vol.2.

Aymerich et al., "An automatic assessment system supporting computer science entrance examinations," Advanced Learning Technologies, 2004. Proceedings. IEEE International Conference on Joensuu, Finland Aug. 30-Sep. 1, 2004, Piscataway, NJ USA, IEEE, DD. 657-659 (Aug. 30, 2004).

Bradlow, A., Pisoni, D., Akahane-Yamada, R., Tokhura, Y. (1997). Training Japanese listeners to identify English /r/ and /I/: IV. Some effects of perceptual learning on speech production. Journal ofthe Acoustical Society of America. pp. 2299-2310 an Abstract of article.

Bradlow, Pisoni, Yamada, Tohkura, Acquisition of the English /r/-A/ Contrast by Japanese Speakers: Effects of Training in Perception on Production. ICPhS 95 Stockholm, vol. 4 pp. 562-565, session 85.2. Summary.

Chen et al., "Task-oriented modelling of autonomous decentralised systems," Autonomous Decentralized Systems, 2000. Proceedings. 2000 International Workshop on Chengdu, China Sep. 21-23, 2000, Los Alamitos, CA, USA, IEEE Comput. Soc., US, pp. 172-179 (Sep. 21, 2000).

"Cortez et al., ""Teaching Science with Mobile Computer Supported Collaborative Learning (MCSCL),"" Wireless and Mobile Technologies in Education, 2004, Proceedings. The 2 IEEE International Workshop on Jungli, Taiwan, Mar. 23-25, 2004, Los Alamitos, CA, USA, IEEE Comput. Soc., US, pp. 67-74 (Mar. 23, 2004)".

Cristea et al., "Intelligent E-learning environments architecture and basic tools," Information Technology Based Higher Education and Training, 2004. ITHET 2004. Proceedings of the Fifth International Conference on Istanbul, Turkey May 31-Jun. 2, 2004, Piscataway, NJ, USA, IEEE, pp. 610-615 (May 31, 2004).

Digiano et al., "Collaboration Design Patterns: Conceptual Tools for Planning for The Wireless Classroom," Wireless and Mobile Technologies in Education, 2002, Proceedings, IEEE International Workshop on Aug. 29-23, 2002, Piscataway, NJ, USA, IEEE, pp. 39-47 (Aug. 29, 2002).

Extended European Search Report for European Patent Application No. 13793624.1 dated Jan. 18, 2016, 8 pgs.

Genesee, F. (2000). Brain Research: Implications for Second language Leaming. ERIC Digest, EDO-FL•-00-12 (Dec. 2000). 1-5.

International Search Report and Written Opinion for International Application No. PCT/US2017/026861, mailed Jun. 19, 2017, 18 pgs.

International Search Report and Written Opinion, PCT/US2013/042758, mailed Nov. 12, 2013 (11 pages).

International Search Report and Written Opinion, PCT/US2014/53600, mailed Aug. 29, 2014 (10 pages).

Kanter, "An Open Service Architecture for Adaptive Personal Mobile Communication," IEEE Personal Communications, IEEE Communications Society, US, 8 (6), pp. 8-17 (Dec. 2001).

Kopp et al., "Security Architecture for Service-Based Mobile Environments," Pervasive Computing and Communications Workshops, 2005, Percom 2005 Workshops, Third IEEE International Conference on Kauai Island, HI, USA Mar. 8-12, 2005, Piscataway, NI, USA, IEEE, DD. 199-203 (Mar. 8, 2005).

Lively, S., Logan, J., Pisoni, D. (1993). Training Japanese listeners to identify English /I and II. The role of phonetic environment and talker variability in learning new perceptual categories. Journal of the Acoustical Society of America, 94, 1242-1255.

Manguson, J., Yamada, R., Tohkura, Y., Pisoni, D., Bradlow, A. (1995). The role of talker variability innonnative phoneme training. Paper presented at the Spring Meeting of the Acoustical Society of Japan.

Maye, J. G.L. (2000). Leaming phonemes without minimal pairs. Paper presented at the 24 Annual Boston University Conference on Language Development. Mar. 2000.

Nagaraja et al., "Evaluating the impact of communication architecture on the performability of cluster-based services," High-Performance Computer Architecture, 2003. HPCA-9 2003. Proceedings. The Ninth International Symposium on Feb. 8-12, 2003, Piscataway, NJ, USA, IEEE, pp. 229-240 (Feb. 8, 2003).

Renaissance Learning, Inc., "Renaissance Special Report: The Renaissance Mastery Model," 2006, 5 pgs.

Richards, J., Platt. J., Platt, H. (1992). Dictionary of Language Teaching Applied Linguistics: Longman. pp. 386, 387 and pp. 392, 393.

Sterritt et al., "Personal autonomic computing self-healing tool," Engineering of Computer-Based Systems, 2004. Proceedings. 11" IEEE International Conference and Workshop on the Brno, Czech Republic May 24-27, 2004, Piscataway, NJ, USA, IEEE, DD. 513-520 (May 24, 2004).

Sun et al., "Design and implementation of Java-based HTTP input channel for integrated WLAN and GPRS networks," Networks, 2004 (Icon 2004). Proceedings. 12" IEEE International Conference on Singapore Nov. 16-19, 2004, Piscataway, NJ, USA, IEEE, US, DD. 258-262 (Nov. 16, 2004).

(56) References Cited

OTHER PUBLICATIONS

Truscott, J. (1998). Instance theory and universal grammar in second language research. Second Language Research, 14(3), 257-291.
Wang, "Context Awareness and Adaptation in Mobile Learning," Wireless and Mobile Technologies in Education, 2004, Proceedings, The 2" IEEE International Workshop on Jungli, Taiwan, Mar. 23-25, 2004, Los Alamitos, CA, USA, IEEE Comput. Soc., US, pp. 154-158 (Mar. 23, 2004).
Yatani et al., "Musex: A System for Supporting Childrens Collaborative Learning in a Museum with PDAS," Wireless and Mobile Technologies in Education, 2004, Proceedings, The 2" IEEE International Workshop on Jungli, Taiwan, Mar. 23-25, 2004, Los Alamitos, CA, USA, IEEE Comput. Soc., US, pp. 109-112 (Mar. 23, 2004).
Gallacher, Tom, and Martin Johnson. "Learning Progressions": A Historical and Theoretical Discussion, 2019.

* cited by examiner

AUTOMATED ALIGNMENT OF EDUCATION CONTENT

CROSS REFERENCE TO RELATED APPLICATIONS

This application claims priority under 35 USC § 119(e) to the provisional U.S. Application No. 63/478,568 titled "Automated Alignment of Education Content" and filed on Jan. 5, 2023, wherein the entirety of the provisional application is herein incorporated by reference.

BACKGROUND

1. Field of the Invention

The present invention relates to systems and methods that facilitate online education and learning. More particularly, the present invention relates to an integrated platform architecture designed to facilitate and enhance automated content connections, which automatically align content. Automated alignment of educational and/or instructional content optimizes student exposure and development in an online cloud-based environment by promoting discovery and organization of heterogeneous instructional resources for use by students, educators, and other users. This automated alignment of educational content enables generating data to assist with conforming the instructional process, at any level (e.g., district, state, national, or global) across different regions and integrates assessment, teaching, and learning-solution operations for both students and educators.

2. Description of the Related Art

With digital instruction on the rise, within the last twenty years, the exercise of aligning electronic resources has become an ordeal for students, teachers, educators and others involved in the educational environment. In the past, everyone relied on printed books to either learn or teach from. With the increasing use of digital resources, there are an overwhelming number of electronic resources available online. As the digital universe of educational content expands exponentially and the complexity of digital curriculums increases, teaching and learning exercises have only become more challenging and time consuming every day. For instance, aligning materials with objectives so that learning materials are chosen specifically and primarily to help students achieve their educational objectives in the most direct way possible is critical to their success. Picking learning materials that will make the pathway to mastering those objectives as straight and continuous as possible for the students is important. For example, to promote active learning, well-defined learning objectives should include tasks that students perform that are anchored in action verbs and materials that are aligned with those objectives. All other things being equal, learning material that encourages students to actively engage with ideas and reflect on that activity is automatically more aligned with clear, measurable learning objectives than one that does not.

Education systems all over the world vary. Each country bases its education on cultural and historical perspectives. Even in the United States alone, the educational system is not standard across different states. Each state varies the use of curriculum, books, and other teaching modules. Moreover, state assessment varies from one state to another. Every state in the United States has a different educational curriculum largely because it is created based on the factors including accessibility, autonomy, and diversity of a state. The federal government does not really have the authority in recognizing and modifying educational institutions. All educational institutions, programs, and curriculums must pass the standards set by each state. Furthermore, all institutions must have the necessary license in order to engage in any instructional matters.

Curriculums may differ from one state depending on the rulings of the state itself and other factors that affect the state curriculum. State curriculum believes that a student will be able to learn more depending on the field itself. Between a standard and state curriculum, state curriculum is what many students and parents like as they believe that state curriculum is a better option. In a given scenario, a student will be able to understand teachings of a particular issue if it is relevant to the student's state. So, primarily, each state curriculum is based on the needs and location of a certain state. Likewise, historical background differs in different states, so it is better to be under the state curriculum than be part of a standard one, which is not equipped to tackle the historical lineage of each state.

At present, the state curriculum is developed by the state with the help of education experts, school system, school administrators, and teachers themselves. A curriculum guide is often presented on the district level. The teachers often have the upper hand on developing the modules of what they will be included in their teachings. Part of the curriculum also includes the complimentary instructions like textbooks, teaching manuals, and multimedia resources. State curriculum also includes a standardized test and assessments of students after a given year. This provides insight into how the students have progressed in their learning.

Given the many different standards and variations, existing digital instruction technology is unable to automatically align content before presenting the content to teachers, students, or others. Previous solutions were inadequate or deficient and are solved by the present technology. This background description provided herein is for the purpose of generally presenting the context of the disclosure.

SUMMARY

The present technology and techniques created and introduced herein overcome the deficiencies and limitations of prior systems and methods, at least in part by, providing an integrated and automated platform with improved systems and methods for generating models that facilitate aligning educational content from diverse sources for use in the U.S., across global regions or internationally.

Some embodiments of a system architecture and methods that enable automated alignment of educational content are disclosed. This system facilitates and enhances automated content connections. It is configured to create models that automate and facilitate the alignment of educational content from diverse sources. Diverse content ranging from specific questions to instructional plans may be aligned independently or through a knowledge graph. This alignment includes jurisdiction dependent definitions of educational goals, such as standards and learning objectives.

In accordance with some aspects of the present invention, model inputs include one content set being assimilated and associated metadata persisted in a data store or storage where another content set may be added for comparison. Content is evaluated to determine perfect text matches and also imperfect matches that are close in semantic meaning.

The system's algorithm compares one-to-one matches, many-to-one match, one-to-many match, and many-to-many matches.

In accordance with some aspects of the present invention, the system's algorithm is configured to compare multiple products, their education units of information, and academic standards as designated between various agencies. The output of the algorithm may produce likely matches and other content items that are clearly not matches. The results are provided in a user interface that helps editors more quickly make matches based on similarity/believability scores and promotes the most likely matches to the top of the user interface. Human Editor selections and corrections are automatically collected for analysis to provide "human-in-the-loop" feedback to be used to further improve the model. The "clearly not" matched items may be reviewed and studied for future algorithm learning and drift analysis.

Additional details are described below in the detailed description.

BRIEF DESCRIPTION OF THE DRAWINGS

The present invention is illustrated by way of example, and not by way of limitation in the figures of the accompanying drawings in which like reference numerals are used to refer to the same or similar elements.

DETAILED DESCRIPTION

The present disclosure relates to automatically aligning content for users. The systems and methods of this technology are directed to an innovative system architecture, technical tools (e.g., to facilitate and link educational activities involving input and output by different users) and processes configured to facilitate automated alignment of education content, by generating integrated models for use in online, cloud-based, or device-specific environments, for improving the educational process. In one implementation, the models and technical tools in accordance with the present invention may be implemented in the "cloud." In another implementation, the models and technical tools in accordance with the present invention may be implemented on an electronic device. In yet another implementation, the models and technical tools in accordance with the present invention may be implemented in both the cloud and a device. The term "cloud" as referred to herein, may be a global network of servers, each with a unique function. The cloud is not a physical entity, but instead is a vast network of remote servers around a region or the globe, which are coupled together to operate as a single ecosystem. These servers are designed to either store and manage data, run applications, or deliver content or a service such as streaming content, providing software etc. Instead of accessing files and data from a local or personal computer, users may access them online from any Internet-capable device, making the information or the resources available anywhere users may be and anytime users desire to use them.

This integrated approach embodied in the technical components described here provide a comprehensive view of education content from diverse jurisdictions (national, regional, or international) and with different academic standards as designated by various educational agencies (in any national, regional, or international environment). It should be recognized by those skilled in the art that diverse jurisdictions may include but not limited to any of the following: a state, provenance, agency, department, district, dioecy, federal etc.

Figure 1:
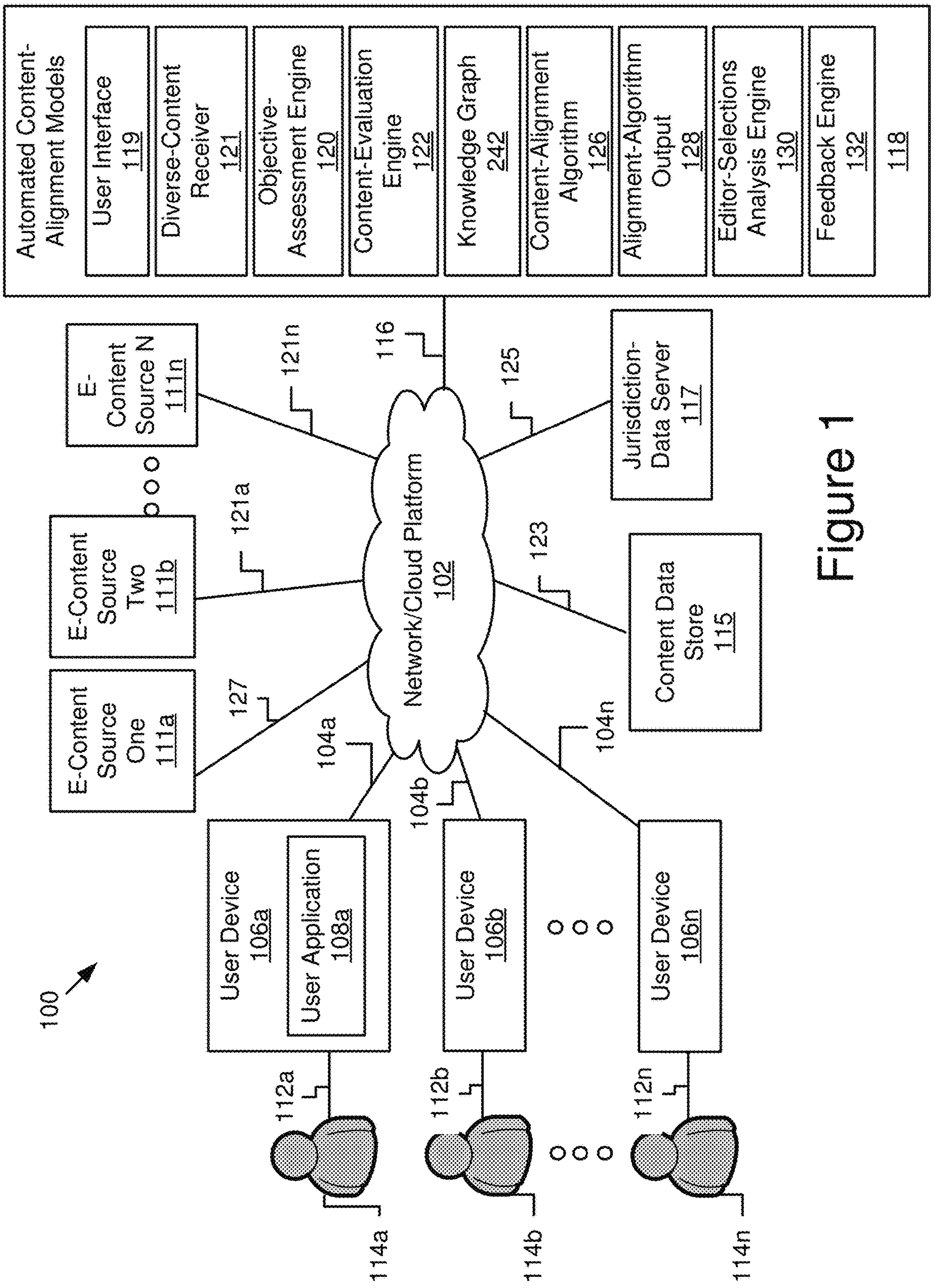
FIG. 1 is a high-level block diagram illustrating one implementation of an example content alignment automation system in a networked and distributed environment including user devices for use by any users (e.g., students, teachers, etc.) coupled to the content alignment automation system integrating content-alignment models comprising different engines with specific functions that are dedicated to performing specific operations for use in education.

FIG. 1 illustrates a general distributed environment (e.g., cloud-based or client-server architecture for implementing user applications) as designated generally by reference numeral 100, with user device designated by reference numerals 114*a*, 114*b*, through 114*n*, who may be students, teachers, administrators or anyone or any entity in the educational environment (a state, provenance, agency, department, district, dioecy, federal etc.), using user devices, designated by reference numerals 106*a*, 106*b*, through 106*n*, to interact with integrated and automated content-alignment models application (also referred to as engine) 118, via a network 102 (e.g., a cloud platform). Each of the user devices may have a user application 108*a* (to leverage the data generated by the automated-content alignment models application 118 (illustrated only in user device 106*a*, for ease of explanation). User communications or input actions flow via lines 112*a*, 112*b*, through 112*n*, respectively, to the user devices, 106*a*, 106*b*, through 106*n*, and through lines 104*a*, 104*b*, through 104*n*, into the network 102 (and beyond).

The network 102 may be a conventional type, wired or wireless, and may have numerous different configurations including a star configuration, token ring configuration, or other configurations. Furthermore, the network 102 may include any number of networks and/or network types. For example, the network 102 may include a local area network (LAN), a wide area network (WAN) (e.g., the Internet), virtual private networks (VPNs), mobile (cellular) networks, wireless wide area network (WWANs), WiMAX® networks, Bluetooth® communication networks, peer-to-peer networks, near field networks (e.g., NFC, etc.), and/or other interconnected data paths across which multiple devices may communicate, various combinations thereof, etc. The network 102 may also be coupled to or include portions of a telecommunications network for sending data in a variety of different communication protocols. In some implementations, the network 102 may include Bluetooth communication networks or a cellular communications network for sending and receiving data including via short messaging service (SMS), multimedia messaging service (MMS), hypertext transfer protocol (HTTP), direct data connection, WAP, email, etc. In some implementations, the data transmitted by the network 102 may include packetized data (e.g., Internet Protocol (IP) data packets) that is routed to designated computing devices coupled to the network 102. Although FIG. 1 illustrates one network 102 coupled to the user devices 106*a*-106*n*, the integrated alignment models engine 118, the plurality of E-content data sources 111*a*-111*n*, the content data store 115, and the jurisdiction-data server 117, in practice one or more networks 102 can be connected to these entities.

The user devices 106*a*-106*n* (also referred to individually and collectively as 106) may be computing devices having data processing and communication capabilities. In some implementations, a user device 106 may include a memory, a processor (e.g., virtual, physical, etc.), a power source, a network interface, software and/or hardware components, such as a display, graphics processing unit (GPU), wireless transceivers, keyboard, camera (e.g., webcam), sensors, firmware, operating systems, web browsers, applications, drivers, and various physical connection interfaces (e.g., USB, HDMI, etc.). The user devices 106*a*-106*n* may couple to and communicate with one another and the other entities of the system 100 via the network 102 using a wireless and/or wired connection. Examples of user devices 106 may include, but are not limited to, laptops, desktops, tablets, mobile phones (e.g., smartphones, feature phones, etc.), server appliances, servers, virtual machines, smart TVs, media streaming devices, user wearable computing devices or any other electronic device capable of accessing a network 102. In the example of FIG. 1, the user device 106*a* is configured to implement an integrated user application 108*a* integrated with the automated content-alignment models 118 engine described in more detail below. The user device 106 includes a display (FIG. 3) for viewing information provided by one or more entities coupled to the network 102. For example, the user device 106 may be adapted to send and receive data to and from the integrated automated content-alignment models server 118. While two or more client devices 106 are depicted in FIG. 1, the system 100 may include any number of user devices 106. In addition, the user devices 106*a*-106*n* may be the same or different types of computing devices. The user devices 106*a*-106*n* may be associated with the users 114*a*-114*n* to receive their input as illustrated by signal line 112*a*-112*n*. For example, users 106*a*-106*n* may include students, educators, teachers, administrative staff, and others in the educational environment. Each user device 106 may be associated with a data channel, such as a mobile application running on a user's smartphone, a computer in a school office, an administrator or assessment tracking device, etc. These data channels may collect data related to one or more users and provide that data to the entities coupled to the network 102. In some implementations, the user devices 106 may be implemented as a computing device as will be described below.

Figure 4:
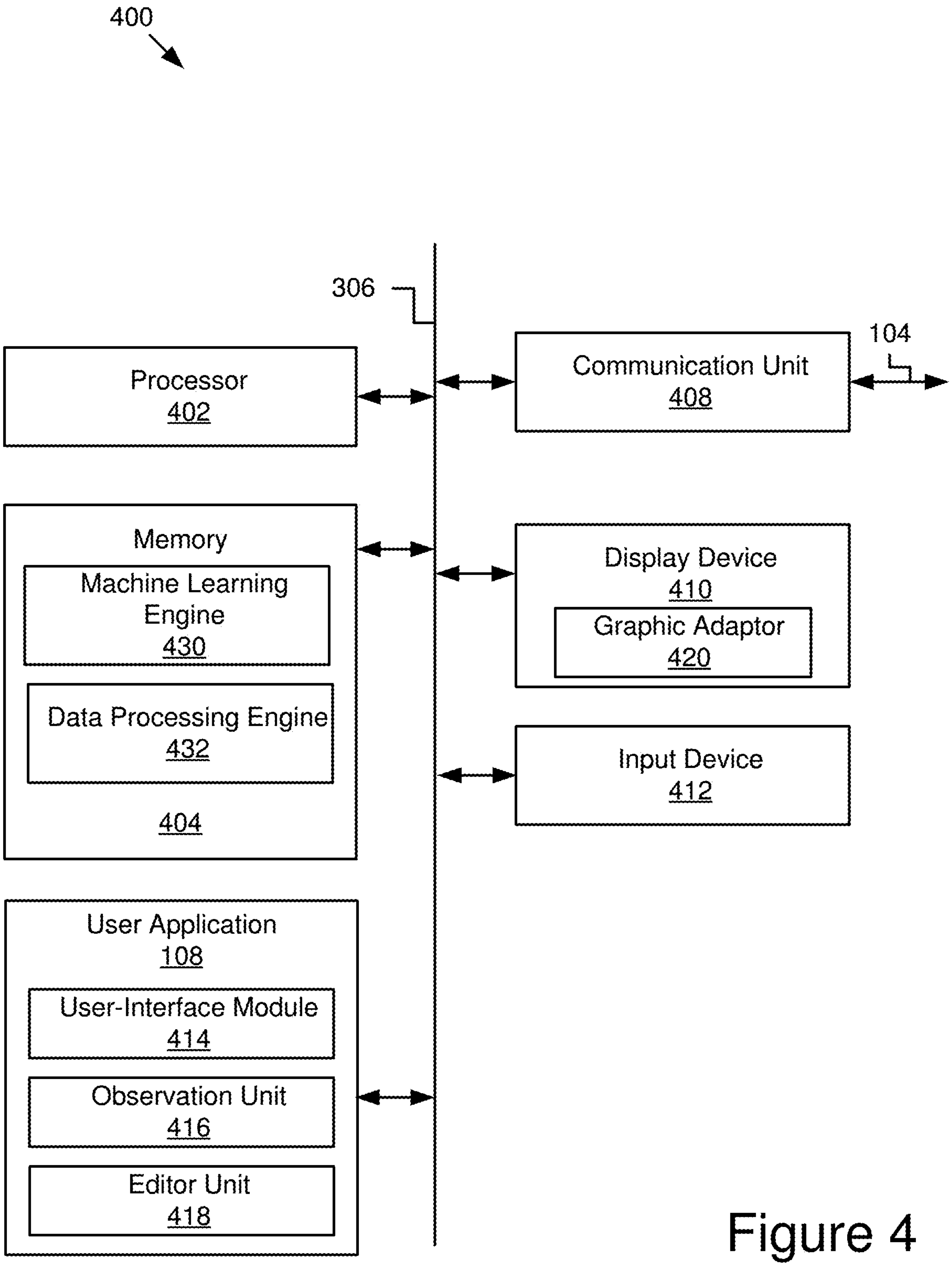
FIG. 4 is a block diagram of an example user device (with the application) that interacts with the content alignment automation system and its automated content-alignment models.

In some embodiments, user input may interact through line 116 with the content-alignment models application 118. The content-alignment models application 118 integrate functionalities of various sub-systems, including but not limited to, a user interface 119, a diverse education-content receiver or identifier 121, an objective-assessment engine 120, a content-evaluation engine 122, a knowledge graph 242, a content-alignment algorithm 126, an alignment-algorithm output 128, an editor-selections analysis engine 130, and a feedback engine 132. Access to each of these subsystems or engines is accomplished via an observation engine, which is a part of the user interface 119 (one part designated as an observation unit 416 (FIG. 4). The user interface engine 119 may include software and/or logic for providing user interfaces to a user. In some implementations, the user interface engine 119 receives instructions from the other components in the server 118 and generates a user interface according to the instruction, and transmits the user interface for display on the user device as described here. In some implementations, the user interface engine 119 sends graphical user interface data to an application (e.g., a browser in the user device 106 to display the data as a graphical user interface for a dashboard (see FIG. 9).

The content-alignment models application 118 facilitate digital reading and enable collaboration in and with the pages of digital books, articles, and documents. In some implementations, the text of interest or display may be for assessment, lesson planning, or any other task described herein. In some examples, the text may be the text content on a page of a digital book available on the web or downloaded as an ePub (electronic publication) or PDF (portable document format). The automated content-alignment models application 118 have access to diverse educational content from global sources. It is well known that as geographical regions differ, the education system in different countries differs. Every country has a different approach to education and ideas of the best philosophy for schools and students can vary quite significantly across the globe. For example, the history and culture of a place can a huge part in what schooling means to them.

The automated content-alignment models application 118 may be implemented on one or more servers with one or more processors and one or more storage devices storing data or instructions executable by the one or more processors. In some embodiments, the content-alignment models are integrated with a plurality of data sources and servers, each of which may be, or may be implemented by, a computing device including a processor, a memory, applications, a database, and network communication capabilities similar to those described here. For example, the content-alignment models application 118 may be implemented on a server, a server array or any other computing device, or group of computing devices, having data processing, storing and communication capabilities. The content-alignment models application 118 may be a virtual server (i.e., a virtual machine) implemented via software. For example, the virtual server operates in a host server environment and accesses the physical hardware of the host server including, for example, a processor, memory, storage, network interfaces, etc., via an abstraction layer (e.g., a virtual machine manager). In some implementations, the content-alignment models server 118 may be a Hypertext Transfer Protocol (HTTP) server, a Representational State Transfer (REST) service, or other server type, having structure and/or functionality for processing and satisfying content requests and/or receiving content from one or more of the user devices 106, and the other servers coupled to the network 102. It should be understood that the content-alignment models 118 application may be implemented on any combination of devices and servers, or only one device or server.

Also, instead of or in addition, the content-alignment models server 118 may implement its own application programming interface (API) for transmission of instructions, data, results, and other information between the server 118 and other entities communicatively coupled to the network 102. For example, the API may be a software interface exposed over the HTTP protocol by the integrated server 118. The API exposes internal data and functionality of the service hosted by the integrated server 118 to API requests originating from one or more of the integrated applications 118, the plurality of data sources server 111, and the plurality of third-party servers, for example, the jurisdiction-data server 117. In one example, the integrated application implemented by the integrated server 118 passes an authenticated request including a set of parameters for information to one or more of the third-party servers 117 and the data sources 111 and receives an object (e.g., XML or JSON) with associated results. In some implementations, the integrated server 118 may also include a database coupled to it (e.g., over the network 102) to store structured data in a relational database and a file system (e.g., HDFS, NFS, etc.) for unstructured or semi-structured data. In some implementations, the integrated server 118 may include an instance of a data store 115 that stores various types of data for access and/or retrieval by the integrated application operable on the server 118. For example, the data store 115 may store user data associated with various users. The user data may include a user identifier (ID) uniquely identifying the users (e.g., students, educators etc.), a user (e.g., student) profile, one or more data metrics of the users (e.g., students) corresponding to data received from one or more channels. Other types of user data are also possible and contemplated. In some implementations, the integrated server 118 sends and receives data to and from other entities of the system 100 via the network 102. For example, the integrated server 118 sends and receives data including instructions to and from the user device 106. In some implementations, the integrated server 118 may serve as a middle layer and permit interactions between the user device 106 and the plurality of the third-party servers 117 and the content data sources 111 to flow through and from the integrated server 118 for security and convenience. In some implementations, the integrated server 118 may be operable to receive, store, and/or integrate variety of diverse user data, generate student scores, determine actionable program interventions using one or more trained machine learning models, automatically execute the actionable program interventions to manage student growth. The integrated server 118 may send data to and receive data from the other entities of the system 100 via the network 102. It should be understood that the integrated server 118 is not limited to providing the above-noted acts and/or functionality and may include other network-accessible services. In addition, while a single integrated server 118 is depicted in FIG. 1, it should be understood that there may be any number of integrated servers 118 or a server cluster.

The content-alignment models application or server 118 may interact with the user devices 106*a*-106*n* or other third-party servers, for example, a jurisdiction-date server 117 or media-distribution servers represented as E-Content Source One 111*a*, E-Content Source Two 111*b*, through E-Content Source N 111*n* (each of which may provide diverse content), or a Content Data Store 115 (with the models software including knowledge graph etc.), in the distributed system 100, via the network 102, or may be coupled to and interact with any of these entities via a direct data connection.

In some embodiments, the entities of the distributed system 100 including the content-alignment models server 118 and the other servers may be implemented using cloud-based architectures where one or more computer functions are performed by remote computing systems and devices at the request of a local computer device. For example, a user device 106*a* may be a computing device having a limited set of hardware and/or software resources and may access hardware and/or software resources provided across the network 102 by other computer devices and resources, such as other user devices 106*b*, the jurisdiction-data server 117, the content-alignment models server 118, or any other computing resources. The user device 106*a* may access these resources through an automated-content-alignment user application 108*a*, such as a web browser or customized application, and the results of any computer functions or resources may be delivered through the automated-content-alignment user application 108*a* to the user by the user device 106*a*, such as those described. The content-alignment models application 118 may be implemented in a cloud-based distributed computing system having dynamically scalable and virtualizable resources, and various functionalities of the content-alignment models application 118. Alternatively, in some embodiments, the content-alignment models 118 may be implemented as software within a device or may be implemented within the automated-content alignment user application, which may be downloaded on the user device. The content-alignment models include the functionalities of the user interface 119, the diverse-content receiver 121, objective-assessment platform 120, the content-evaluation engine 122, the knowledge graph 242, the content-alignment algorithm 126, the alignment-algorithm output 128, the editor-selections analysis engine 130, and the feedback engine 132 may be carried out and supplemented by computing systems and devices distributed over the network 102. Although only one example configuration of the automated content-alignment models 118 is shown, multiple servers/platforms may be used to implement in the system 100 for regional or global reach or execution or for specific purposes.

Each of the E-content sources (one, two, and n) designated as reference numerals 111*a*, 111*b*, and 111*n* is a computing device and/or system for transmitting electronic resources stored in or available through the content data store 115 to the other entities in the environment 100. In some embodiments, these servers cooperate with the automated content-alignment models 118 to provide data that a user 114*a* (e.g., teacher or student) can leverage with respect to an electronic resource for consumption. For example, the content-alignment models 118 may transmit data on a file (e.g., a webpage) to a user device 106*a* for display to the user 114*a*. In some instances, the file may include code (e.g., a video player) executable to receive a video and/or audio stream (e.g., an electronic resource) from the E-content servers and render it for display to the user. In the depicted embodiment, the content data store 115 is coupled to the network 102 via signal line 123 for communication with the other entities of the environment 100. The content data store 115 is also coupled to the E-content sources to access electronic resources and other data stored there. In some embodiments, the content data store 115 is a hardware server including a processor, memory and network communication capabilities. In other embodiments, the content data server 115 is a virtual server.

In some embodiments, the content data store 115 has the content-alignment models 118 that execute one or more operations on the video and audio streams for display on one or more user devices 106*a-n*. The video and audio streams may be live feeds or may be previously recorded, stored as media objects in the E-content source, and transmitted to the one or more user devices 106*a-n* on demand, via delayed broadcast, etc. In some embodiments, the audio and video are streamed from the content data store 115 via the network 102. In other embodiments, a user can download an instance of the video and audio media objects from the content data store 115 to a local repository for storage and local playback.

The content data store 115 and/or the content alignment models 118 is/are capable of receiving any number of electronic resources from any number of user devices 106*a-n* simultaneously. While in the illustrated embodiment, only one content data store 115 is shown, any number of content data stores 115 and/or E-content sources 111 may be included in the distributed environment 100. For example, the content data store 115 and the E-content source may be a distributed server and storage system with local instances strategically located in locations where spikes in demand for the electronic resources are likely to occur. For example, if a cluster of user devices 106*a-n* are located in a particular geographic region, local instances of the content data store 115 and the E-content source may be coupled to the network 102 in that geographic region such that the media objects stored in the E-content source may be served locally and at a faster data rate to that cluster of user devices 106 *a-n*.

It should be understood that, in some embodiments, the content data store 115 and/or the jurisdiction-data server 117 have the same or similar architecture (e.g., memory, processor, communication unit, bus, etc.) as the content-alignment models 118 illustrated in FIG. 2, and thus the description of those components applies to the E-content source 111*a-n* and/or the jurisdiction server 117.

The E-content source 111*a-n* is an information source for storing specific source data and providing access to stored data. Each of the plurality of E-content sources 111*a-n* may be, or may be implemented by, a computing device including a processor, a memory, applications, a database, and network communication capabilities. In some implementations, the data sources may be a data warehouse, a system of record (SQR), or belonging to a data repository owned by an organization that provides real-time data automatically or responsive to being polled or queried by the integrated server 118. Each of the E-content source servers 111 may be associated with a first or third-party entity (e.g., a server associated with a separate company or service provider). The stored data may include the electronic resources described above, such as media objects including video, audio, vector-based files, electronic books, documents, etc. In some embodiments, specific data on the E-content source (objectives and comparison objectives and associated metadata is stored in the memory of the content data store 115 (see FIG. 2). In other embodiments the E-content source may provide data that is stored in the memory 304 (see FIG. 3) of the content-alignment models 118. In yet other embodiments, the E-content source is included in a server or storage system distinct from but accessible by the content data store 115 and the automated content-alignment models 118. In some embodiments, the E-content source includes a database management system (DBMS) executable by a processor to manage a collection of records, files, and objects including the media objects. For example, the database could be a structured query language (SQL) DBMS. In these embodiments, the automated content-alignment models 118 and/or the content data store 115 are coupled to a E-content data source 111*a* through 111*n*, via the bus 306 to store data in multi-dimensional tables having rows and columns, and manipulate, i.e., insert, query, update and/or delete, rows of data using programmatic operations (e.g., SQL queries and statements).

The jurisdiction-data server 117 is a server hosting a network-based software application operable to provide various services or functionalities, and to send data to and receive data from the automated content-alignment models 118, the content data store 115, and the user devices 106*a* . . . 106*n* via the network 102. In the depicted embodiment, the jurisdiction-data server 117 is coupled to the network 102 via signal line 125 for communication with the other entities of the system 100. The jurisdiction-data 117 is also coupled to the content data store 115 by signal lines 125 and 123 for accessing and storing data. In some embodiments, the jurisdiction-data server 117 is a server, server array, or any other computing device, or group of computing devices, having data processing, storing and communication capabilities. In other embodiments, jurisdiction-data server 117 is a virtual server.

The jurisdiction-data server 117 can provide access to data for use and stored in the data store 115 that is associated with users of the automated content-alignment models 118. In some embodiments, the data stored in the content data store 115 may include data on jurisdiction dependent definitions of educational goals, objectives and comparison objectives and associated metadata, the knowledge graph, results data generated by the knowledge graph alignment (as illustrated in FIG. 2) and algorithm results (as illustrated in FIG. 2). In some embodiments, additional data may be stored, for example, demographics data, achievement data, student data, teacher data, standards data, inter-rater reliability data, etc. The jurisdiction-data server 117 may include a software application for providing secure access to data on jurisdiction dependent definitions of educational goals (e.g., national, regional, or international) to the automated content-alignment models 118 over the network 102 via an API. For example, in an educational setting, the demographics data may include instructor and pupil demographics data, and may be segmented across school district, school, classroom, grade, etc.; the achievement data may include standardized test scores for educators and pupils; the student data may include student assessments of teachers (e.g., aggregated from surveys, reviews, etc.), biographical data describing the students publicly shared data, etc.; the teacher data may include biographical data describing the teachers, teachers publicly shared data etc.; teacher preferences, teacher assessments of students (e.g., aggregated from surveys, reviews, etc.), etc.; and the standards data may include standards compiled and approved by a governing organization or institution which define the levels of attainment pupils much reach to be considered acceptably educated. It should be recognized that the fifty states in the U.S. may have unique needs and standards for education. It should also be recognized that education standards, objectives, or goals vary across countries and also regions within countries. Different standards may be based on states or districts, or alternatively, provenance, agency, department, dioecy, federal etc. There also exist international educational frameworks and organizations. For example, the International Standard Classification of Education (ISCED) is a statistical framework for organizing information on education maintained by the United Nations Educational, Scientific and Cultural Organization (UNESCO). There are efforts underway to globalize educational standards. As another example, the European Education Area fosters collaboration among the European Union Member States to build more resilient and inclusive national education and training systems. Standardizing global educational organizations and practices via management systems help manage processes and activities to meet global objectives and goals. There are standardized curricula, learning, and tests that are used across the world. The standards and frameworks may require a varying range of skills. As an example, national U.S. agencies may include the "Wisconsin Department of Public Instruction," "Kansas State Department of Education," "New York Department of Education," and so on. In some embodiments, a local instance of the data stored in the content data store 115 may be included in the data store 115. For example, a batch program operating periodically (every few minutes, hours, days, weeks, etc.) may retrieve a refreshed version of the data stored in the data store 115.

Figure 2A:
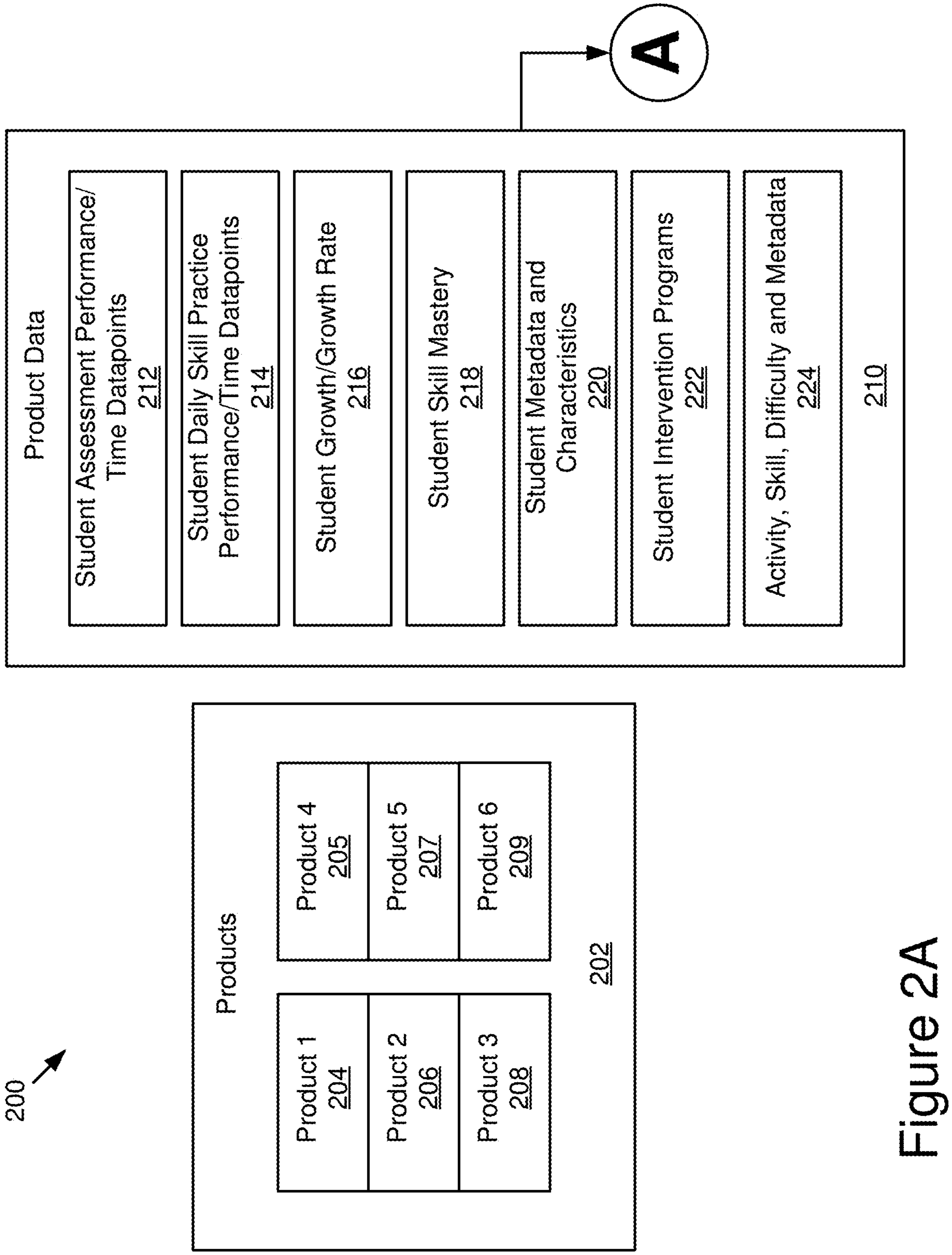
FIGS. 2A-2C illustrate block diagrams of one implementation of the various sub-systems and engines of the automated content-alignment models. Some components illustrated in FIG. 2A connect to components in FIG. 2B via a designator labeled "A." The components illustrated in FIG. 2B connect to the components illustrated in FIG. 2C via designators "B," "C," "D," and "E."
Figure 2B:
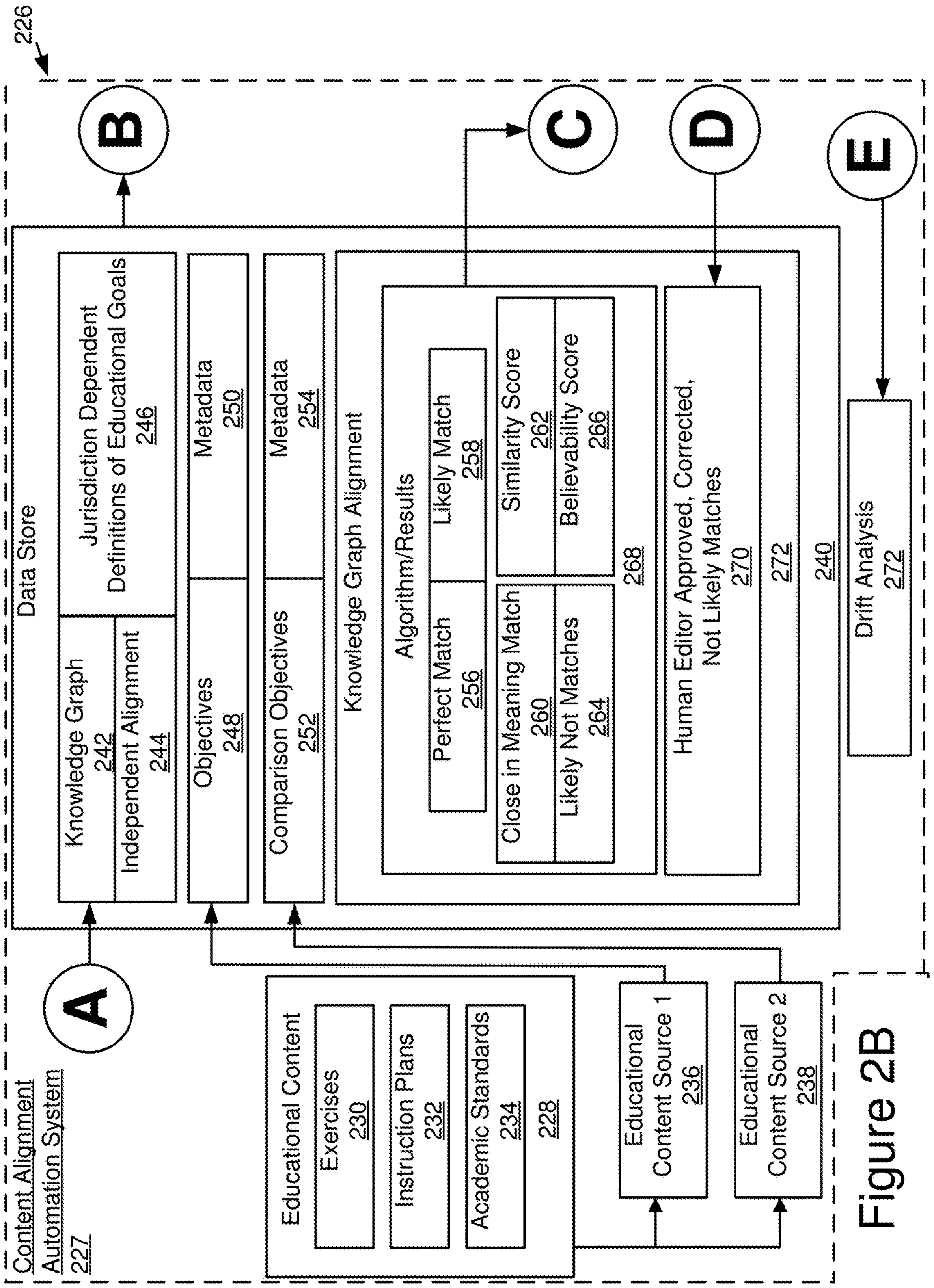

Referring now to FIG. 2A, the example model in accordance with the present invention that is illustrated is constructed to automate and facilitate the alignment of educational content from diverse sources as designated by reference numeral 200. Diverse content ranging from specific questions to instructional plans or exercises or academic standards may be aligned independently or through a knowledge graph. This automated content alignment (by the automated content-alignment models 118) include jurisdiction dependent definitions of educational goals, such as standards and learning objectives. Model inputs include one content set being assimilated and associated metadata persisted in a data store (e.g., in content data store 115) where another content set can be added for comparison. Content is evaluated (e.g., by the content-evaluation engine 122) for perfect text matches and also imperfect matches that are close in semantic meaning. An algorithm is used to compare and determine one-to-one matches as well as many-to-one, one-to-many, and many-to-many matches. It can be used to compare both multiple products and their education units of information as well as academic standards as designated by various agencies (e.g., any of these illustrated above or others and as provided by the jurisdiction-data server 117). The output of the model (e.g., provided by the alignment-algorithm output 128) includes likely matches and other content items that are clearly not matches. The result is provided in a user interface ("UI") 119 that helps editors more quickly make matches based on similarity/believability scores and promotes the most likely matches to the top of the user interface 119. In some embodiments, the user interface 119 may serve as an Editor Matching User Interface (UI) as illustrated in FIG. 2. Human Editor selections and corrections are automatically collected for analysis (e.g., by the editor-selection analysis engine 130) to provide human-in-the-loop feedback (e.g., via the feedback engine 132) to be used to further improve the model. The "clearly not" matched items can be reviewed and studied for future algorithm learning and drift analysis (useful to those skilled in the art). As illustrated in FIG. 2A, examples of products include "Product 1," "Product 2," "Product 3," "Product 4," "Product 5," and "Product 6." The products data referenced generally by reference numeral 210 in these example products may include various types of datasets. The illustrated embodiment illustrates a dataset 212 on Student Assessment Performance/Time Datapoints illustrated, a dataset 214 on Student Daily Skills Practice Performance/Time Datapoints, a dataset 216 on Student Growth/Growth Rate, a dataset 218 on Student Skill Mastery, a dataset 220 on Student Metadata and Characteristics, a dataset 222 on Student Intervention Programs, and a dataset 224 on Activity Skill, Difficulty Metadata. The educational content provided may include exercises, instructional plans or academic standards, provided via the E-Content Sources One, Two through N (FIG. 1). The Content Data Store 115 (FIG. 1) comprises a knowledge graph, independent alignment capability and jurisdiction dependent definitions of educational goals. The electronic content (e.g., types 1 and 2) is assessed for objectives and the metadata is stored. A comparison algorithm compares the objectives and the metadata is again stored. The education content alignment algorithm executes and determines by the knowledge graph alignment the algorithm results the following: "perfect match," "close in meaning match," "likely not matches," "likely match" and assigns a similarity score or a believability score or both. This output is provided to a human editor to approve and correct the output that is determined to have "likely no matches." The editor matching user interface may provide "very likely matches" with similarity scores (e.g., one through ten) and believability scores (e.g., A through Z) and provide these for human editor corrections. The user interface in some embodiments presents options to the human editor to provide corrections, for example, select or approve matches. Instances of no matches are marked as "Clearly Not." Data for audit process is provided in some embodiments for drift analysis. All electronic content that is aligned is provided to a student grouping and recommendations system. In operation, the various products illustrated generally by reference numeral 202, are merely representative. It should be recognized by those skilled in the art that many more products than the products illustrated, for example product 1 referenced by reference numeral 204, product 2 referenced by reference numeral 206, product 3 referenced by reference numeral 208, product 4 referenced by reference numeral 210, product 5 referenced by reference numeral 207, and product 6 referenced by reference numeral 209 may be used. Each of the products are configured to receive and accumulate product data 210 on students and compile datasets. The datasets include student assessment performance/time datapoints 212, student daily skill practice performance/time datapoints 214, student growth/growth rate 216, student skill mastery 218, student metadata and characteristics 220, student intervention programs 222, activity, skill, difficulty, and metadata 224. The components in FIG. 2A are coupled to additional components in FIG. 2B via connector "A." Data flows from the components in FIG. 2A into the knowledge graph 242 in the data store 240.

Referring now to FIG. 2B, the content alignment automation system 226 comprises content alignment automation operation software 227, including educational content 228, comprising exercises 230, instruction plans 232, and academic standards 234. The education content 228 is derived from an educational content source 1, represented by reference numeral 236, and educational content source 2, represented by reference numeral 238. The data store 240 comprises a knowledge graph 242, an independent alignment algorithm 244, jurisdiction dependent definitions of educational goals 246, objectives 248, metadata 250, comparison objectives 252, and metadata 254.

The data store 240 further comprises a knowledge graph alignment algorithm 272. The knowledge graph alignment algorithm 272 is configured to perform comparative functions on content to determine various types of outcomes, including but not limited to, a perfect match 256, a likely match 258, a close in meaning match 260, likely not matches 264, and not likely matches 270. Based on the matches, the processor assigns scores, namely, a similarity score, 262 and a believability score 266. The outcomes are illustrated as algorithm results 268. In addition, datasets that are human editor approved, corrected, or determined to be no likely matches are represented by reference numeral 270. The components in FIG. 2B connect to the components illustrated in FIG. 2C via connectors "B" and "C," with data flow from the components illustrated in FIG. 2B to those in FIG. 2C. Moreover, connectors "D" and "E" also connect to components in FIG. 2C, with data flow into the components illustrated in FIG. 2B.

Figure 2C:
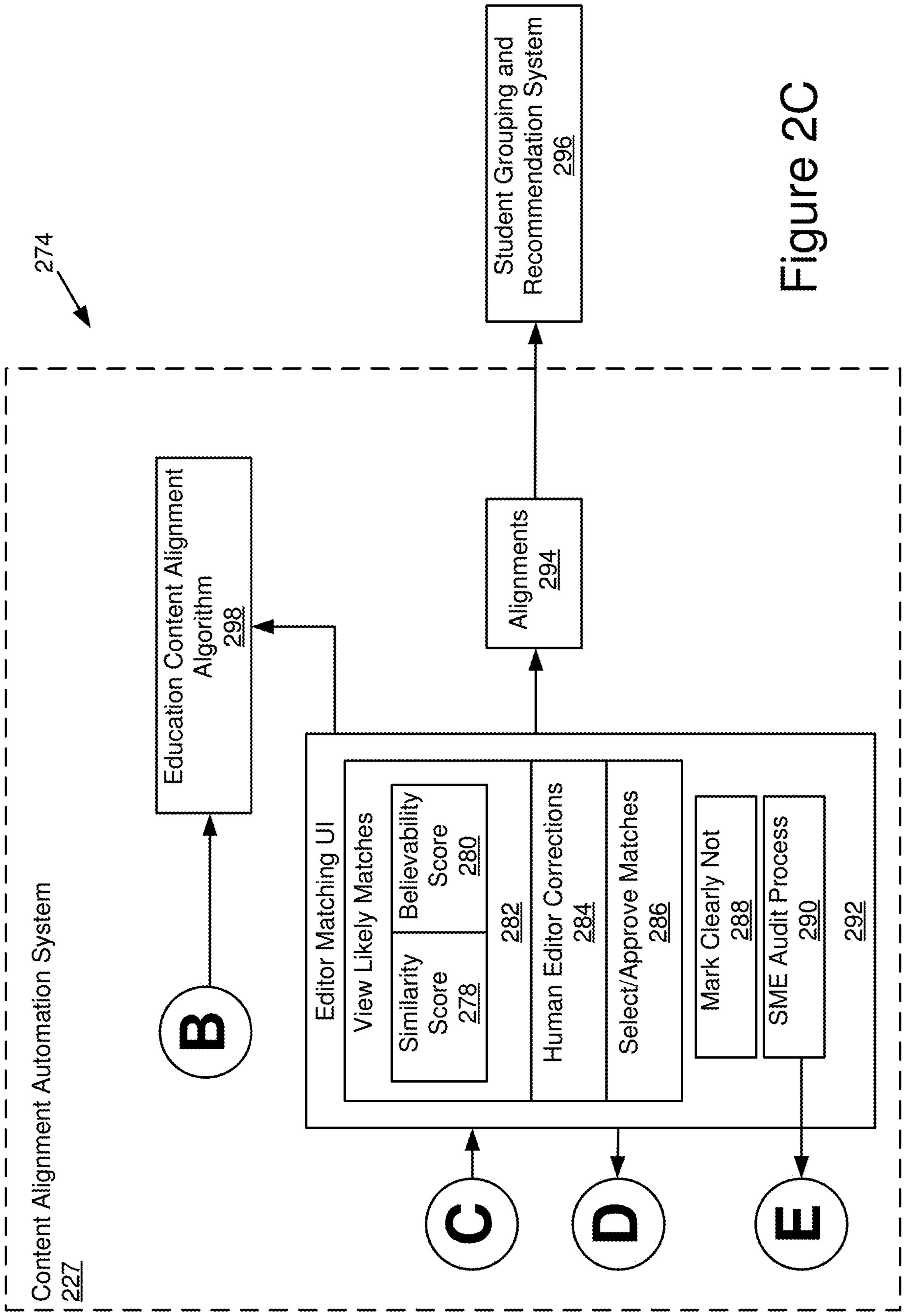

Referring now to FIG. 2C, various components of the content alignment automation system 227 are illustrated with broken lines represented by reference numeral 274. An input signal received via connector "B" from the data store 240, couples to the education content alignment algorithm 298. As illustrated, an editor matching user interface ("UI") 292, couples to the education content alignment algorithm 298. Various datasets are compiled using functions operable within the user interface including a function on view likely matches represented by reference numeral 282, including assigning a similarity score 278 and a believability score 280. The editor matching UI 292 further includes functions operable including a human editor corrections function represented by reference numeral 284, a select/approve matches function represented by reference numeral 286, a mark clearly not function represented by reference numeral 288, and a "SME" (small and medium size enterprises or entities) audit process function represented by reference numeral 290. Resulting outcomes and datasets gathered are channeled via alignments function represented by block 294. The editor matching user interface 292 is also illustrated as coupling to the education content alignment algorithm 298. The "alignments" function block 294 is coupled to provide output to a student grouping and recommendations system 296.

Figure 3:
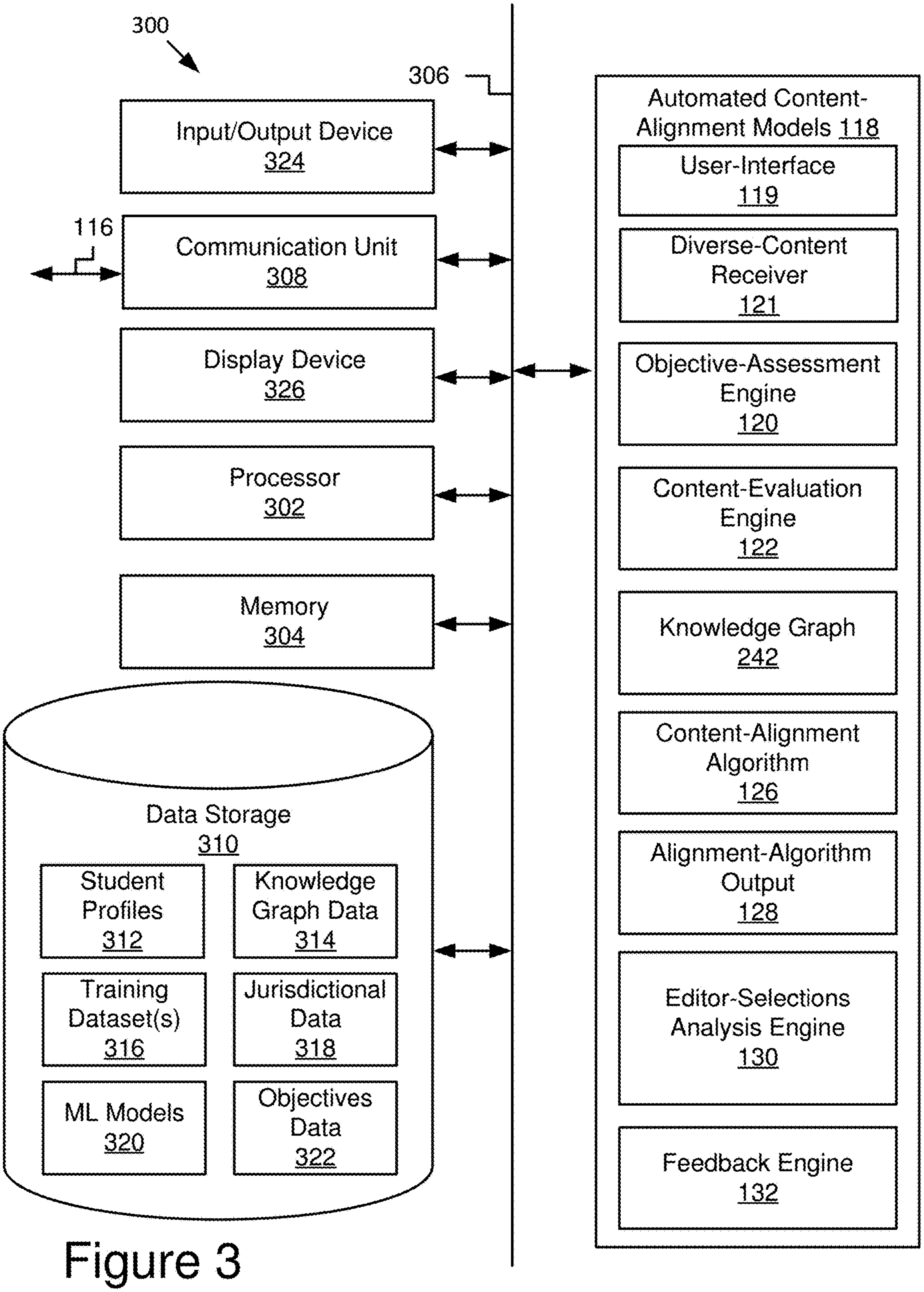
FIG. 3 is a block diagram illustrating components of example automated content-alignment models illustrating various elements within the models.

Referring now to FIG. 3, various components of the present invention are illustrated generally by reference numeral 300. In FIG. 3, the automated content-alignment models 118 include a user-interface unit 119 (e.g., Editor Matching UI in FIG. 2), a diverse-content receiver 121, an objective-assessment engine 120, a content-evaluation engine 122, a knowledge graph 242, a content-alignment algorithm 126, an alignment-algorithm output 128, an editor-selections analysis engine 130, a feedback engine 132, and a reporting platform (not shown). The objective-assessment engine 210 is software including routines for providing network-based assessment of students. FIG. 3 also illustrates the input/output device 324, the communication unit 308, the display device 326, the processor 302, the memory 304 and the data storage 310. The data storage 310 illustrates compiled datasets. In some embodiments, the datasets may include student profiles 312, knowledge graph data 314, training dataset(s) 316, jurisdictional data 318, ML models 320, and objectives data 322.

The automated content-alignment models 118 may collect and store mapping information (i.e., knowledge graphs) in the content data store 115, which maps how all content from the E-content sources 111*a*-111*n* are associated based on data from the jurisdiction-data server 117, which may provide information on different educational standards by region or administration. The electronic content in some instances may be associated by school, school district, subject matter taught, etc. The automated content-alignment models 118 may also generate and maintain linking data in the content data store 115 or the E-content sources for specific electronic content automatically aligned by the automated content-alignment models 118. In some embodiments, access to the automated content-alignment models 118 via the network 102 may be provided to teachers and administrators in an academic environment or other educational setting, such as a school district.

An electronic resource may be any electronic media for conveying information. For example, an electronic resource can be instructional in nature, and can convey knowledge, information, and resources to a user who interacts with or views it. As a further example, an electronic resource may include an instructional audio or video segment, a publication, an interactive instructional reference, a lesson plan, a planning tool, a community forum, a sharing tool, an industry standard, a portfolio tool, a progress monitoring tool, a reporting tool, etc. In some embodiments, an electronic resource can include any of textural data, graphical data, video data, audio data, etc. For example, the electronic resource may be a webpage including one or more of text, graphics, video, audio, etc. In another example, the electronic resource may be or include a downloadable or streamable media object, including, for example, an electronic document (e.g., portable document format (PDF) document), electronic book (e-book), digital video, digital audio file, vector graphics file, etc. In these or other examples, the electronic resource may include a dataset/electronic file with text, graphics, video, audio, etc. embedded therein.

In some embodiments, these electronic resources may convey information on various topics, such as student training, teaching skills, and similar subjects of consequence and importance to the growth and development of the users. For instance, for teachers an electronic resource may be an instructional video about an aspect of teaching, and a teacher may view the video by streaming it using his/her user device 106. In another example, the electronic resource may be a web-based interactive reference including text, audio, video, etc., and the teacher may study the reference by interacting with it via a client application 106 such as a web browser before determining that it is appropriate for a particular student, student group or a particular lesson plan.

The content-alignment models 118, global in scope, may be tailored by institution, agency, jurisdiction, or educational intent or the like. For the purposes of this disclosure, it should be recognized that education has many standards and preferences that must be met in a particular country, state, or district. For example, the common core state standards initiative in the U.S. is an educational initiative that details what K-12 students should know in English language arts and mathematics at the end of each grade. This initiative seeks to establish consistent educational standards across the states as well as ensure that students graduating from high school are prepared to enter credit-bearing courses at two or four-year college programs to enter the workforce.

The E-content sources, either directly or via the content data store 115, access the electronic resources stored therein. In some embodiments, the content data store 410 may collect information about the electronic resources. For instance, it can aggregate attributes of the electronic resources, such as the author, publisher, file size, creation date, publication date, a thumbnail of the resource, etc., and store them in a resource library database. In various embodiments, the content data store 115 can access the electronic resources 111*a*-111*n* to transmit or stream copies of those resources to the user devices 106*a-n* of the users 114*a-n* requesting to interact with them.

The E-content source is capable of receiving requests for electronic resources from user devices 106*a-n* and fulfilling those requests by transmitting the electronic resources to the corresponding user devices 106*a-n* of the users 114*a-n*. In one example, upon logging in to the content-alignment platform, a user device 106*a* may be presented with an interface by the user application 108*a* that may provide electronic resources (e.g., video, audio, etc.). When users consume or interact with particular electronic resources from the E-content sources 111*a*-111*n*, the content is stored in the 115 in association with those users. In some instances, only the electronic content may be stored. The user application 108*a* may include software and/or logic to provide the functionality for generating actions. The server 118 application may include software and/or logic to provide the functionality for providing scores, recommending actionable intervention etc. In some embodiments, the applications may be implemented using programmable or specialized hardware, such as field-programmable gate array (FPGA) or an application-specific integrated circuit (ASIC). In some embodiments, the applications may be implemented using a combination of hardware and software. In one implementation, the integrated application is stored and executed on the server 118 alone. In another implementation, the application is sored and executed on the user device 106 alone. In yet another implementation, the application may be stored and operated on the user device, and the server 118. In other implementations, the application may be stored and executed on various combinations of the computing systems described herein.

In some embodiments, the user application 108*a* may monitor user interactions with the electronic resources. For example, when user interacts with a user interface generated and displayed by the user application 108*a*, the user application 108*a* may record interaction data via the network 102. In a further example, if a user interacts with a media player embedded in a user interface of the user application 108*a*, interaction data describing the user's interactions, such which actions the user took (e.g., clicked a pause button, a play button, a scrubbing dial, volume dial; maximized the viewing field of the media player; added a comment about the video using an associated interface element; etc.) may be stored by the user application 108*a* or otherwise used.

In some implementations, the integrated server 118 may require users to be registered with the integrated server 118 to access the acts and/or functionality described herein. For example, to access various acts and/or functionality provided by the integrated server 118, the integrated application 108 and server 118 may require a user to authenticate his/her/their identity. For example, the integrated application 108 and server 118 may require a user seeking access to authenticate their identity by inputting credentials in an associated user interface. In another example, the integrated application 108 and server 118 may interact with a federated identity server (not shown) to register and/or authenticate the user by scanning and verifying biometrics including facial attributes, fingerprint, and voice.

Other variations and/or combinations are also possible and contemplated. It should be understood that the system 100 illustrated in FIG. 1 is representative of an example system and that a variety of different system environments and configurations are contemplated and are within the scope of the present disclosure. For example, various acts and/or functionality may be moved from a server 118 to a user device 106, or vice versa, data may be consolidated into a single data store or further segmented into additional data stores, and some implementations may include additional or fewer computing devices, services, and/or networks, and may implement various functionality client or server-side. Furthermore, various entities of the system may be integrated into a single computing device or system or divided into additional computing devices or systems, etc.

In some embodiments, the user application 108*a* may use presentational information to form the look and feel of the user interfaces. For example, the electronic file(s) or data stream(s) may be formatted using a markup language (e.g., HTML, XML, etc.), style sheets (e.g., CSS, XSL, etc.), graphics, and/or scripts (e.g., JavaScript, ActionScript, etc.), and the client application 108*a* may interpret the interface instructions and render an interactive Web User Interface (WUI) for display on a user device 106*a* based thereon. In other implementations, the user application 108*a* may determine the formatting and look and feel of the user interfaces independently. Using the user interfaces presented by the client application 108*a*, the human editor can input commands selecting various actions.

In some embodiments, the user-interface 119 (FIGS. 1, 2, and 3), in cooperation with an observation engine, may generate a dashboard/interface to provide viewing selections generated for human editors. In some instances, the drift analysis may be provided.

The objective-assessment engine 120, the content-evaluation engine 122, the knowledge graph 242, the editor-selections analysis engine is software including routines for binding responses from multiple activities (or tasks or results) received from assessment, alignment etc.

FIG. 4 illustrates various components of the present invention referenced generally by reference numeral 400. The various components are coupled by a bus 306 to a communication unit 408, a processor 402, a memory 404, a display device 410 with a graphics adaptor 420, an input device 412, and the user application 108, with a user-interface module 414, an observation unit 416, and an editor unit 418.

The processor 402 processes data signals and program instructions received from the memory 404 and data storage (e.g., at other remote locations). The processor 402 may comprise an arithmetic logic unit, a microprocessor, a general or special purpose controller or some other processor array to perform computations and provide electronic display signals to the display device 410 (e.g., on a user device 106*a*). The processor 402 may execute software instructions by performing various input/output, logical, and/or mathematical operations. The processor 402 is coupled to the bus 306 for communication with the other components. The processor 402 may comprise various computing architectures including a complex instruction set computer (CISC) architecture, a reduced instruction set computer (RISC) architecture, or an architecture implementing a combination of instruction sets. The processor 402 may be physical and/or virtual, and may include a single processing unit or a plurality of processing units and/or cores. In some implementations, the processor 402 may be capable of generating and providing electronic display signals to a display device, supporting the display of images, capturing and transmitting images, and performing complex tasks including various types of feature extraction and sampling. In some implementations, the processor 402 may be coupled to the memory 404 via a bus to access data and instructions therefrom and store data therein. The bus may couple the processor 402 to the other components of the computing device including, for example, the memory 404, the communication unit 408, the display device 410 (with graphic adaptor 420), and the input/output device(s) 412. Although only a single processor is shown in FIG. 4, multiple processors may be included. It will be obvious to one skilled in the art that other processors, operating systems, sensors, displays, and physical configurations than those that are illustrated may be used to perform the operations described in this specification.

The memory 404 may be a non-transitory storage medium. The memory 404 stores the instructions and/or data for operating content-alignment models 118, which may be executed by the processor 402. In one implementation, the instructions and/or data stored in the memory 404 comprises code for performing any and/or all of the techniques or functionalities that are described in this specification. The memory 404 may be a dynamic random-access memory (DRAM) device, a static random-access memory (SRAM) device, flash memory or some other memory device known in the art.

The data storage (e.g., content data store 115) stores the data and program instructions that may be executed by the processor 402. In one implementation, the data storage may store the data of various types of users in the web forum. The data storage may include a variety of non-volatile memory permanent storage device and media such as a hard disk drive, a floppy disk drive, a CD-ROM device, a DVD-ROM device, a DVD-RAM device, a DVD-RW device, a flash memory device, or some other non-volatile storage device known in the art.

The communication unit 408 facilitates the communication between the user device 106 (in FIG. 1) and the content-alignment models 118 over the network 102 (in FIG. 1). For example, a user 114*a*, via the user device 106*a*, may access the content-alignment models 118 to view or read electronic content and otherwise interact with the content-alignment models 118 and receive information from the content-alignment models 118, via the communication unit 408. The communication unit 408 also displays the content or information either received from or hosted via the content-alignment models 118 to any of the users 114*a* through 114*n*.

The communication unit 408 couples the content-alignment models 118 to the network 102 by the signal line 116 (in FIG. 1) and via the bus 306. The communication unit 408 may include network interface modules, which include ports for wired connectivity such as but not limited to USB, SD, or CAT-5, etc. The network interface modules are configured to link the processor 402 to the network 102 that may in turn be coupled to other processing systems. The network 102 (FIG. 1) may comprise a local area network (LAN), a wide area network (WAN) (e.g., the Internet), and/or any other interconnected data path across which multiple devices may communicate. The network interface modules are configured to provide conventional connections to the network 102 using standard network protocols such as TCP/IP, HTTP, HTTPS and SMTP as well as any others that are understood to those skilled in the art. The network interface modules include a transceiver for sending and receiving signals using WIFI, Bluetooth® or cellular communications for wireless communication. Each of the platforms, modules, and/or engines described above may include software or program instructions configured to perform the functionalities described here.

The bus 306 may represent one or more buses including an industry standard architecture (ISA) bus, a peripheral component interconnect (PCI) bus, a universal serial bus (USB), or some other bus providing similar functionality. The bus 306 may include a communication bus for transferring data between components of the computing device or between computing device and other components of the system 100 via the network 102 or portions thereof, a processor mesh, a combination thereof, etc. In some implementations, the application 108 and server 118 and various other software operating on the computing devices (e.g., an operating system, device drivers, etc.) may cooperate and communicate via a software communication mechanism implemented in association with the bus 306. The software communication mechanism may include and/or facilitate, for example, inter-process communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication may be configured to be secure (e.g., SSH, HTTPS, etc.).

The illustrated content-alignment models 118 depicted in FIGS. 4 (and 1-3) is provided by way of example and it should be understood that it may take other forms and include additional or fewer components without departing from the scope of the present disclosure. For example, in some implementations, the content-alignment models 118 may include an input device 412 and output devices not shown (e.g., a computer display, a keyboard and mouse, etc.). Additionally, it should be understood that the computer architecture depicted in FIG. 4 is applicable to the other entities of the system, such as the content data store 115 and/or the jurisdiction-data server 117 with various modifications.

The processor 402 includes an arithmetic logic unit, a microprocessor, a general-purpose controller, or some other processor array to perform computations and provide electronic display signals to a display device. The processor 402 may be coupled to the bus 306 for communication with the other components of the content-alignment models 118. The processor 402 may process data signals and may have various computing architectures including a complex instruction set computer (CISC) architecture, a reduced instruction set computer (RISC) architecture, or an architecture implementing a combination of instruction sets. Although only a single processor 402 is shown in FIG. 4, multiple processors may be included. The processor 402 may be capable of supporting the display of images and the capture and transmission of images, performance of complex tasks, including various types of feature extraction and sampling, etc. It should be understood that the content-alignment models 118 could include various operating systems, sensors, displays, additional processors, and other physical configurations.

The memory 404 stores instructions and/or data that may be executed by the processor 402. The memory 404 is coupled to the bus 406 for communication with the processor 402 and the other components of the content-alignment models 118. The instructions and/or data may comprise code for performing any and/or all of the techniques described herein. In particular, the memory 404 includes a non-transitory computer-usable (e.g., readable, writeable, etc.) medium, which can be any apparatus or device that can contain, store, communicate, propagate or transport instructions, data, computer programs, software, code, routines, etc., for processing by or in connection with the processor 402. A non-transitory computer-usable storage medium may include any and/or all computer-usable storage media. In some implementations, the memory 404 may include volatile memory, non-volatile memory, or both. For example, the memory 404 may include a dynamic random-access memory (DRAM) device, a static random access memory (SRAM) device, flash memory, a hard disk drive, a floppy disk drive, a CD ROM device, a DVD ROM device, a DVD RAM device, a DVD RW device, a Blue-Ray™ storage device, a flash memory device, or any other mass storage device known for storing information on a more permanent basis. It should be understood that the memory 404 may be a single device or may include multiple types of devices and configurations.

In some embodiments, the memory comprises a machine learning engine 420 or other artificial intelligence configured to gather data, aggregate data into datasets, make determinations, perform comparative functions, correlate data, generate scores and the like. In some embodiments, the datasets that are created or accumulated are used to create, build, and/or update the knowledge graph 242 (FIG. 1). The machine learning engine 420 is coupled to a data processing engine 422 to compile datasets and train the content alignment models application 118 with the various datasets that are compiled and used to process data inputs in real time. In some instances, the scores (believability and similarity) may be generated by giving different weight factors to each of the types of data gathered. These weight factors may be determined by machine learning or other artificial intelligence and may be updated over time as the models change and adapt based on the data collected. The data processing engine 422 processes, correlates, integrates, and synchronizes the received data streams from disparate devices and data sources 111 into a consolidated data stream as described herein. In some implementations, the data processing engine 422 instantiates a data ingestion layer that transports data from the assorted data sources (including the E-content data sources) to the data storage, where it can be sorted, accessed, analyzed by the application and server 118. For example, the data ingestion layer processes incoming data, prioritizes sources, validates individual files, and routes the data to the data storage. In some implementations, the data processing engine 422 instantiates a data transformation layer that maps and converts data from a source format (e.g., of a E-content source) to a destination format. For example, the data transformation layer transforms non-XML data to XML data. The data processing engine 422 creates a user profile for a student user based on processing the received data streams. In some implementations, the data processing engine 422 may update a user profile that is already in the system. The user profile may include data and insights about the user including name, unique user identifier, age, gender, location, profile photo, user preferences, education goals, skill levels, activities etc.). The data processing engine 422 stores and updates the user profiles in the data storage.

In some implementations, the data processing engine 422 curates one or more training datasets based on the data streams received in association the user devices 106, in accordance with algorithms executed by the content alignment server 118. The machine learning engine 420 described below uses the training datasets to train the machine learning models for performing various functionality as described herein. Example training datasets curated by the data processing engine 422 may include, but not limited to, a dataset on student skills, assessment trends, range of expected scores etc. Alternatively, datasets may include, data specific to jurisdictions. In some implementations, the aggregated data may be reviewed, segments identified and labeled, and stored in the data storage. The machine learning engine 420 may include software and/or logic to provide functionality for training one or more machine learning models or classifiers using the training datasets created or aggregated by the data processing engine 420. The machine learning engine 420 is adapted to receive input from data scientists, analysts, or engineering staff to define and enhance the machine learning models. The machine learning engine 420 may also provide portals through which users can provide refinements and improvements to the models or introduce new models. In some implementations, the machine learning engine 420 receives and/or generates data, models, training data, and scoring parameters necessary to create the machine learning models.

For example, the machine learning engine 420 may provide curated data inputs, provide label identification hints and patterns, provide model negators, perform training, testing, approval and publish model versions, perform scoring model parameter tuning, or create scoring accuracy thresholds.

In some implementations, the machine learning engine 420 may be configured to incrementally adapt and train the one or more machine learning models every threshold period of time. For example, the machine learning engine 420 may incrementally train the machine learning models every hour, every day, every week, every month, etc. based on the aggregated dataset. In some implementations, a machine learning model is a neural network model and includes a layer and/or layers of memory units where memory units each have corresponding weights. A variety of neural network models may be utilized including feed forward neural networks, convolutional neural networks, recurrent neural networks, radial basis functions, other neural network models, as well as combinations of several neural networks. Additionally, or alternatively, the machine learning model may represent a variety of other machine learning techniques in addition to neural networks, for example, support vector machines, decision trees, Bayesian networks, random decision forests, k-nearest neighbors, linear regression, least squares, hidden Markov models, other machine learning techniques, and/or combinations of machine learning techniques. In some implementations, the machine learning engine 420 may train one or more machine learning models to perform a single machine learning task or a variety of machine learning tasks. In other implementations, the machine learning model may be trained to perform multiple tasks.

The machine learning engine 420 determines a plurality of training instances or samples from the labelled dataset curated by the data processing engine 422. The machine learning engine 420 may apply a training instance as input to a machine learning model. In some implementations, the machine learning engine 420 may train the machine learning model using any one of at least one of supervised learning (e.g., support vector machines, neural networks, logistic regression, linear regression, stacking, gradient boosting, etc.), unsupervised learning (e.g., clustering, neural networks, singular value decomposition, principal component analysis, etc.), or semi-supervised learning (e.g., generative models, transductive support vector machines, etc.). Additionally, or alternatively, machine learning models in accordance with some implementations may be deep learning networks including recurrent neural networks, convolutional neural networks (CNN), networks that are a combination of multiple networks, etc. The machine learning engine 420 may generate a predicted machine learning model output by applying training input to the machine learning model. Additionally, or alternatively, the machine learning engine 420 may compare the predicted machine learning model output with a known labelled output from the training instance and, using the comparison, update one or more weights in the machine learning model. In some implementations, the machine learning engine 420 may update the one or more weights by backpropagating the difference over the entire machine learning model.

In some implementations, the machine learning engine 420 may test a trained machine learning model and update it accordingly. The machine learning engine 420 may partition the labelled dataset obtained from the data processing engine 422 into a testing dataset and a training dataset. The machine learning engine 420 may apply a testing instance from the training dataset as input to the trained machine learning model. A predicted output generated by applying a testing instance to the trained machine learning model may be compared with a known output for the testing instance to update an accuracy value (e.g., an accuracy percentage) for the machine learning model. Once a model is trained and tested, the model is then published and made available for turning predictions. In some implementations, the model may be versioned and serviced through an internal HTTP endpoint to be used by other component(s) of the application 118. In some implementations, model training, testing and publishing will be iterative, and adapted automatically. New versions will be published based on improvements based on training of historical data and efficiency calculations as more data is collected over a period of time.

The knowledge graph alignment engine 272 may include software and/or logic to provide functionality for determining content alignments and for providing the similarity score 262 and the believability score 266. For example, these scores may be used to determine and recommend an actionable intervention to manage student recommendations via the student grouping and recommendation system 296 associated with particular students.

The communication unit 408 is an interface for sending to and receiving data from other computing devices. In the depicted embodiment, the communication unit 408 is coupled to the network 102 by the signal line 104 and coupled to the bus 306. In some embodiments, the communication unit 408 includes a network interface device (I/F) having ports for wired connectivity. For example, the communication unit 408 includes a CAT-5/6/7 interface, USB interface, or SD interface, etc. The communication unit 408 may also include a transceiver for sending and receiving signals using Wi-Fi, Bluetooth® or cellular communications for wireless communication. The communication unit 408 can link the processor 402 to the network 102 that may in turn be coupled to other processing systems. The communication unit 408 can provide connections to the network 102 and to other entities of the system 100 using standard communication protocols including, for example, TCP/IP, HTTP, HTTPS, etc.

The observation unit 416 is software and/or logic including routines for facilitating observational assessments received from the objective-assessment engine 120. In particular, the observation unit 416 may send, receive and store observation-related data, such as observation data, templates and files including questions and answers tied to performance standards (e.g., standards related to execution, compliance, effectiveness, personalized editor plans, etc.), identify and suggest electronic learning resources based on observation-related data received, generate reports including drift analysis or any other data described herein.

In the illustrated embodiment, the observation unit 416 engine 120 cooperates with other engines and is coupled for communication with the other components of the content alignment models 118. The observation unit 416 is also coupled to the network 102 via the communication unit 408 for communication with the other entities of the system.

In some embodiments, the user-interface module 414, the observation unit 416, and the editor unit 418 are sets of instructions executable by the processor 402 to provide their respective functionality. In other embodiments, these components are stored in the memory 404 and are accessible and executable by the processor 408 to provide their respective functionality. In any of these embodiments, these components may be adapted for cooperation and communication with the processor 402 and other components of the content-alignment models 118.

The observation unit 416 is software including routines for sending, receiving, processing, and storing observation-related data. In some embodiments, the observation unit 416 may provide observation templates to editors for use in observing and assessing content.

The content of the observation templates may be displayed to users via user interfaces generated and displayed by the user application 108. The user interfaces displaying the content of an observation template to an editor may also provide functionality for completing the various fields of the template. For example, while observing a target subject in the field, an editor may interact with interface elements presented by the user application 108 to input information about the electronic content.

In some embodiments, an observation template may include predefined questions and answers for assessing the electronic content against various predetermined requirements. For example, the requirements may be based on institutional policy, compliance with requirements, legislated practices, or industry standards, and the questions may be directed to whether or not the electronic content meets those requirements/standards. In these embodiments, the same template may be used repeatedly by an editor to record his/her observations of electronic content. In other embodiments, various different templates may be used for the observational assessments of an electronic content.

The electronic resources may be distributed among several data stores located across the network or cloud platform 102 or may be stored in a single content data store 115. In the illustrated embodiment, the E-content source and the content data store 115 work cooperatively to store the electronic resources. In any of the foregoing embodiments, the resources stored in the data store may be cataloged, for example, In some embodiments, the observation data viewed by an editor includes data quantifying the electronic content. For example, the data may be based on predefined assessment scores, such as similarity scores and believability scores. These scores may reflect a rank based on one or more criteria. A criterion may be any attribute associated with the electronic resources. For example, the criterion may include a topic; the number of times an electronic resource has been interacted with, viewed, listened to, etc.; an author; a publisher; a date of the electronic resource; the number of users of who have viewed the electronic content previously; the number of times an electronic resource has been assigned to users having a similar request; etc. In one example, a list of electronic resources may be sorted in order of score and provided incrementally as needed by the user application 108.

The display device 410 represents any device equipped to present output signals generated and provided by the user device 106. In some embodiments, the display device 410 displays electronic images and data including, for example, user interfaces and formatted information. For example, the display device 410 may be any conventional display device, monitor or screen, such as an organic light-emitting diode (OLED) display, a liquid crystal display (LCD), an e-ink display, etc. In some embodiments, the display device 410 is a touch-screen display capable of receiving input from one or more fingers of a user 114*a*. For example, the display device 410 may be a capacitive touch-screen display capable of detecting and interpreting multiple points of contact with the display surface. In some embodiments, the display device 410 may be coupled to the bus 306 via the graphics adapter 420 (shown within the display device 410, but also may be configured outside), which generates and provides display signals to the display device 410. The graphics adapter 420 may be a separate processing device including a separate processor and memory (not shown) or may be integrated with the processor 402 and memory 404.

The input device 412 represents any device for inputting data on the user device 106. In some embodiments, the input device 412 is a touch-screen display capable of receiving input from the one or more fingers of the editor user 114. The functionality of the input device 412 and the display device 410 may be integrated, and a user 114 of the device 106 may interact with the device 106 by contacting a surface of the display device 410 using one or more fingers. For example, the user 114*a-n* may interact with an emulated (i.e., virtual or soft) keyboard displayed on the touch-screen display by using fingers to contacting the display device 410 in the keyboard regions. In other embodiments, the input device 412 is a separate peripheral device or combination of devices. For example, the input device 412 includes a keyboard (e.g., a QWERTY keyboard) and a pointing device (e.g., a mouse or touchpad). The input device 412 may also include a microphone (e.g., for voice input) or other known peripheral devices.

The user application 108 is software including routines for sending and receiving data to the other entities of the system, including, for example, relating to the content-alignment models 118, the content data store 115, and the jurisdiction-data server 117. In some embodiments, the user application 108*a* is a web browser application for accessing the resources provided by the content-alignment models 118. For example, the content-alignment models 118 operated in cooperation with the content data store 115 may be a web-based service and the user application 108 may access various electronic resources provided by the service via uniform resource locators (URLs). In other embodiments, the user application 108*a* is an application customized specifically for accessing the content-alignment models 118, and more particularly, for cooperating and interacting with the observation unit 416.

In the depicted embodiment, the user application 108 provides a user 114*a-n* (e.g., an editor) interacting with the device 106 mechanisms for inputting viewing, adding, modifying, deleting selections-related data related to the electronic content.

In the illustrated embodiment, the user application 108 includes a user-interface module 414 for generating the user interface. While not shown, in some embodiments, the user application 108 may include an authentication or verification module for authenticating the user editor 114*a-n* to access the content-alignment models 118.

In some embodiments, the user application 108, the user-interface module 414, and the other components are sets of instructions executable by the processor 402 to provide their respective functionality. In other embodiments, the user application 108, the user-interface module 414, the observation unit 416, and/or the editor unit 418 are stored in the memory 404 of the user device 106 and are accessible and executable by the processor 402 to provide this functionality.

The observation unit 416 may be coupled to the user-interface module 414 to receive editor input and display the information to the editor 114*a*-114*n* via user interfaces generated by the user-interface module 414. For example, the observation unit 414 may send interface signals to the user-interface module 414, and responsive to receiving these signals, the user-interface module 414 may generate and display user interfaces that correspond to the instructions carried by the interface signals. In another example, the user-interface module 414 may receive input signals from an editor via the input device 412 and send those signals to the observation unit 414 for processing. In some embodiments, in cooperation with the user-interface module 414, the observation unit 414 can receive editor-related and observation-related information and display the data to the editor, display observation templates to the editor, populate observation templates with editor input, save selection files based on the observation templates, transmit selection-related data such as observation files to the observation unit 416 or storage, receive selection-related statistics and reports and organize and display them to the editor or others, receive electronic resources for consumption, etc.

The user-interface module 414 is software including routines for rendering user interfaces and for receiving user input. The user-interface module 414 may be coupled to the input device 412 via the bus 306 to receive input signals from the user 114*a-n*. For example, an observer/user 114*a-n* can select an answer to a selection-related question using the input device 412, and the user-interface module 414 receives signals describing the answer. The user-interface module 414 may store the input signals in the memory 404 for retrieval by the other elements of the client application 108.

The user interfaces generated by the user-interface module 414 include interfaces for inputting, modifying, and deleting information, displaying notifications, rendering video, displaying images and text, displaying vector-based content, sending and storing information, etc. In some embodiments, the user interfaces include user interface elements that allow users/editors 114*a-n* to interact with the user device 106 and input information and commands, such as text entry fields, selection boxes, drop-down menus, buttons, virtual keyboards and numeric pads, etc., as further discussed below with reference to FIG. 5.

Figure 5:
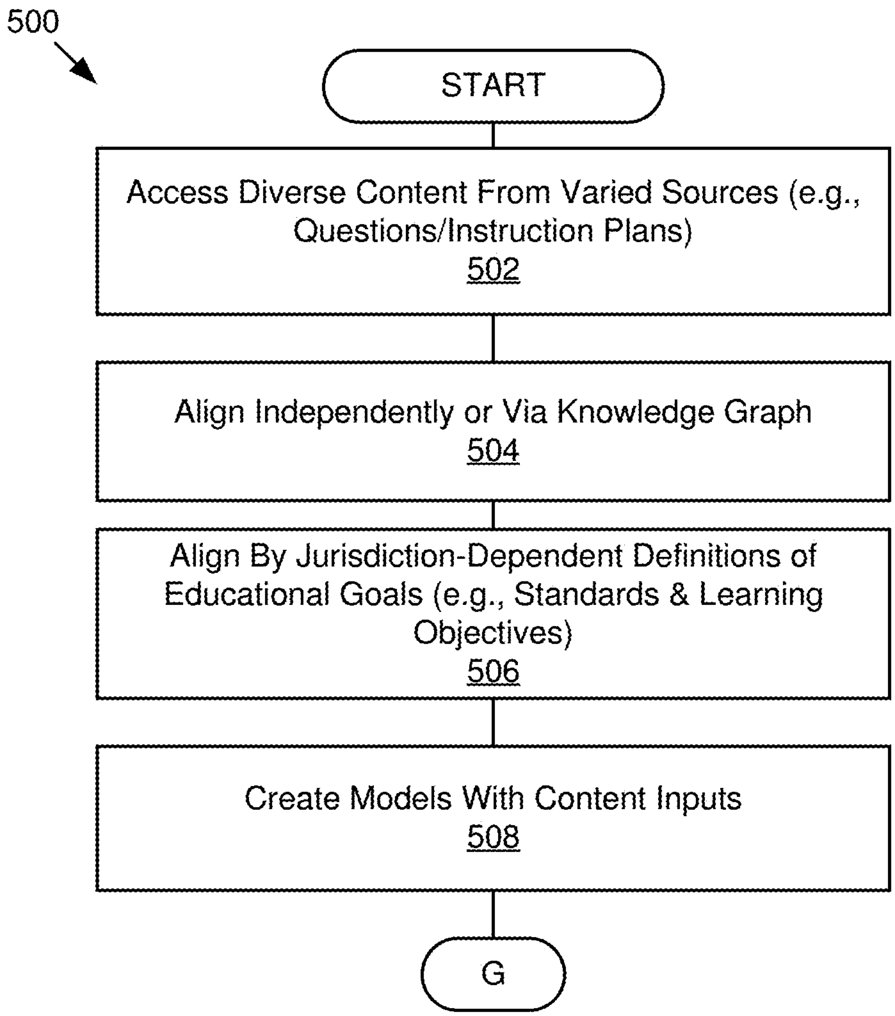
FIG. 5 is a flow chart illustrating an example overall method of the automated content alignment models according to some embodiments of the present invention, specifically, from start to the method to a point "G" in the process.

Referring now to FIG. 5, an example method 500 for automatically facilitating automatic alignment of electronic content (by the models 118) is described. The method 500 begins by accessing diverse content from varied sources, where the diverse content may be questions, instruction plans, academic standards, or electronic resources for students. The method 500 proceeds to the next block 504, including one or more operations for aligning electronic content either independently or by a knowledge graph. The method 500 proceeds to the next block 506, including one or more operations for aligning content by jurisdiction dependent definitions of education goals, for example, by standards and learning objectives. The method 500 proceeds to the next block 508, including one or more operations for creating the models 118 with content inputs. In some implementations, models are created with input of different content sets. The method 500 continues via connector "G" to further operations 600 in FIG. 6.

Figure 6:
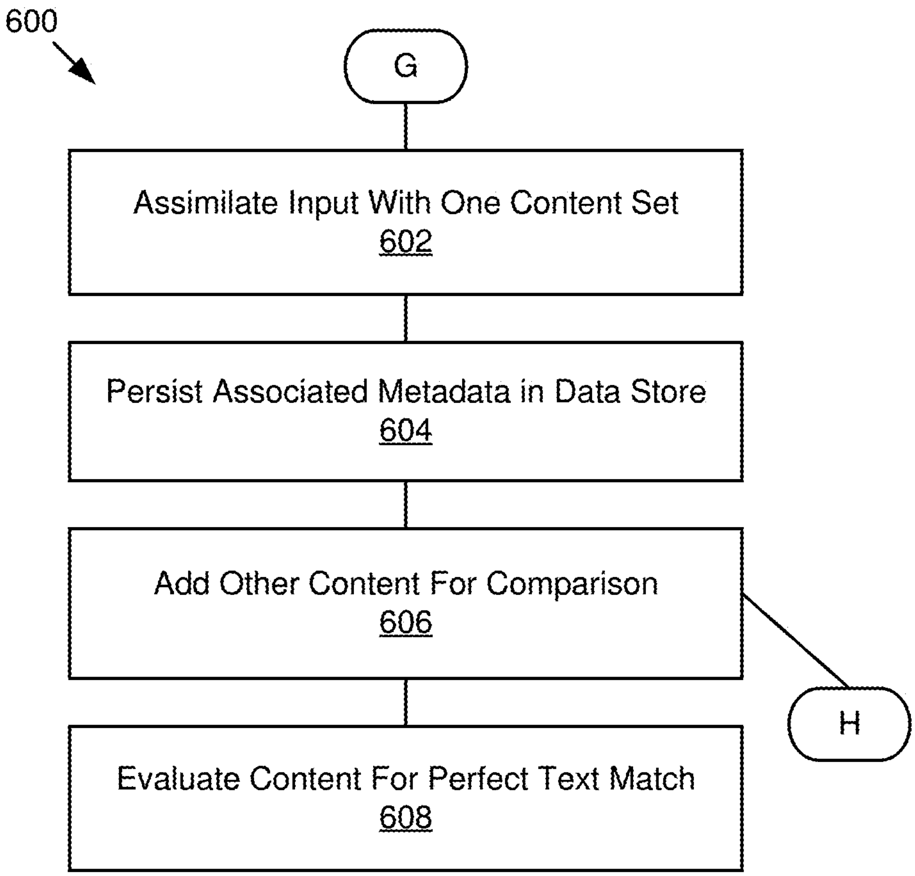
FIG. 6 is a continuing flow chart illustrating further operations in accordance with some embodiments of the present invention, specifically, from point "G" in the process to a point "H" that continues in the next figure.
Figure 7:
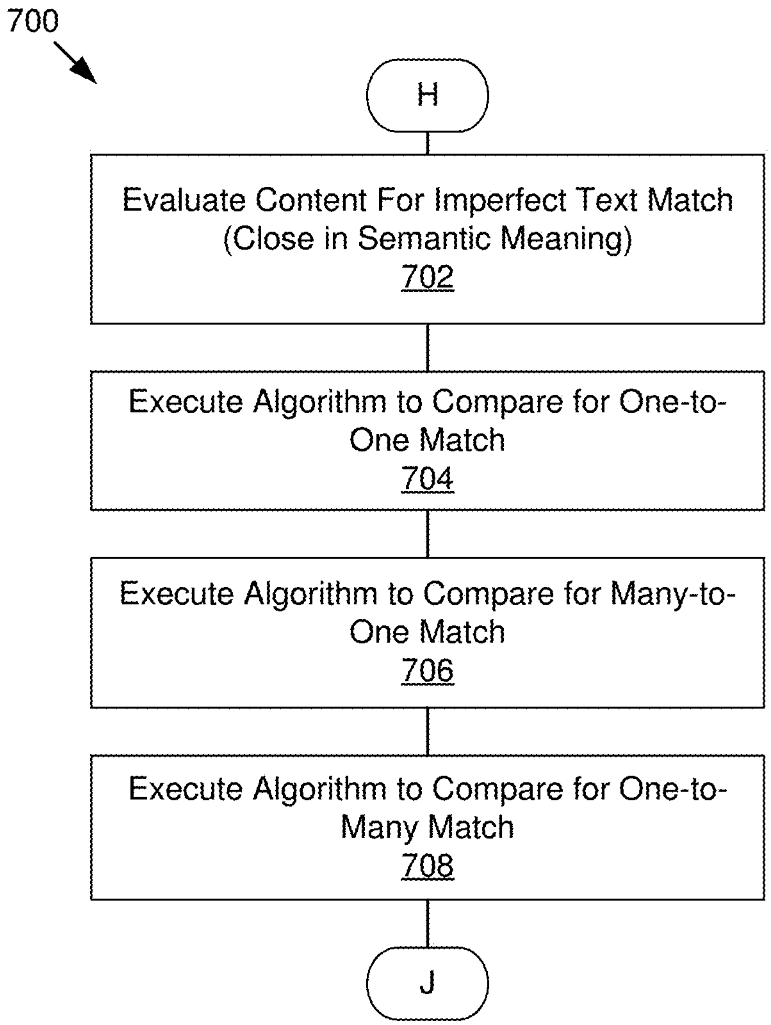
FIG. 7 is a continuing flow chart illustrating further operations in accordance with some embodiments of the present invention, specifically, from point "H" in the process to a point "J" in the process illustrated.
Figure 8:
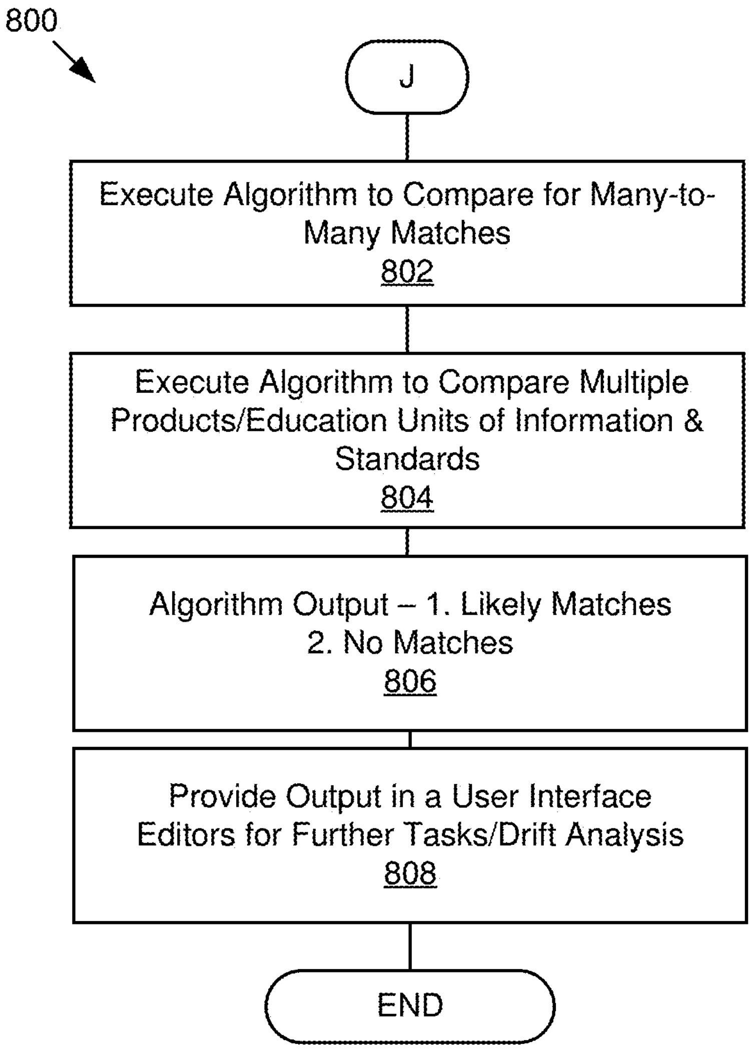
FIG. 8 is a continuing flow chart illustrating further operations in accordance with some embodiments of the present invention, specifically, from point "J" in the process to the end of the process flow illustrated.

Referring now to FIG. 6, the method 600 proceeds to the next block 602, including one or more operations for assimilating input with one content set. The method 600 proceeds to the next block 604, including one or more operations for, persisting associated metadata in a content data store (e.g., content data store 115). The method 600 proceeds to the next block 606, including one or more operations for adding other content (from a diverse source) for comparison. For example, a second set of electronic content from a diverse source (e.g., a different academic standard). At this stage, the method 600 proceeds to the next block 608 including one or more operations for evaluating the content for a perfect match. Alternatively, the method 600, may proceed to the next block illustrated in FIG. 7, via connector “H” Referring now to FIG. 7, the next block of operations designated generally by reference numeral 700, proceeds to the next block 702, including one or more operations for evaluating content for an imperfect text match (e.g., but close in semantic meaning). The method 700 proceeds to the next block 704, including one or more operations for executing an algorithm configured to compare for a one-to-one match. The algorithm is configured to perform a comparison operation on two or more sets of data presented (e.g., Set A compared to Set B). The method 700 proceeds to the next block 706, including one or more operations for executing the algorithm to compare two sets of electronic content (original set (Set A) and one added (Set B)) to determine a many-to-one match. The method 700 proceeds to the next block 708, including one or more operations for executing the algorithm to compare the electronic content sets for a one-to-many match. The method 700 proceeds to the next block of operations illustrated in FIG. 8, via the connector “J.” The method 800 proceeds to the next block 802, including one or more operations for executing the algorithm to compare for many-to-many matches. The process 800 proceeds to the next block 804, which describes that the algorithm may be executed to compare multiple products (as described in FIG. 2). In other embodiments, multiple education units of information and standards may be compared. The method 800 proceeds to the next block 806, including one or more operations for, generating an output that reflects either “likely matches” or “no matches.” Whatever the output, as described in block 808, the output is provided in a user interface to editors who may perform further tasks or a drift analysis, to further refine subsequent operations. It will be recognized by those skilled in the art, that many products, whether for educational purpose or otherwise, may be automatically aligned before being provided via a user interface (e.g., 119 in FIG. 1 or in FIG. 2) for use.

It should be understood that the methods 500-800 are provided by way of example, and the variations and combinations of these methods, as well as other methods, are contemplated. For example, in some embodiments, at least a portion of the methods 500-800 represent various segments of one or more larger methods and may be concatenated or various steps of these methods may be combined to produce other methods which are encompassed by the present disclosure. Additionally, it should be understood that the alignment of electronic resources and reporting on the conclusions of the alignments, as described with reference to at least the methods 600-1300, could be iterative, and thus repeated as many times as necessary to assist in aligning electronic content, by providing data that may be leveraged by the user for that purpose. This data is useful and may be provided by display to a target student, teacher, administrator, or editor. It should be recognized that an example user interface (e.g., 119 or dashboard display 928 in FIG. 9) may be generated and displayed by the user application 108 to allow users 114*a-n* to interact with the system 100 and to allow the system 100 to present information or data (as illustrated in FIG. 2, for example, algorithm results) to the users. For example, various user interfaces may be produced, to display objective, comparison objectives, matches, scores, reports and statistics, display dialogs among the users (by a chat feature), set parameters and settings, send electronic communications, view, listen to and/or interact with the data on the electronic resources provided by the content-alignment models 118, etc. The user interface may include a menu region and an observation region. The menu region may include a listing of products representing a particular geographical region or academic standard.

Variation of this observational user interface is possible. An observational interface may display a dashboard and screenshots that may be specific to a particular subject. In some embodiments, hovering over a standards bar once an electronic resource is selected displays the standard code and text. Changing the selection to standards view displays the state-specific standards code; hovering over the code displays the standard’s text.

The observation region may include a header region and a body region. The header region includes fields for displaying who the editor reviewing the selections is (e.g., Jim Brown) and which selection template is being used for observation, and for inputting the date and time the observation session was started and completed. The header region may also include an options dialogue box for configuring settings, such as generating and sending a report and updating a summary for a particular product. For example, the observer may check a checkbox to set an option for generating and sending a comparative report and for updating a product summary for storage in the data store 115 for later access.

The body region includes elements for the observer to input his/her assessments made during the observation. There is a window (which may appear as a pop-up) for editor activity indicating editor objectives. The body region may also include a resource region for displaying one or more electronic resources or products. In some embodiments, the electronic resources or products displayed in the resource region are received from the E-content sources.

The resource region may include a resource scrolling region, a scrollbar, one or more electronic resources or products, a resource description region, a task button, a preview button, etc. The resource scrolling region provides the editor with functionality to scroll through and select one or more of the various electronic resources displayed therein. The scrolling can be performed by interacting with the scrollbar or the resource scrolling region (e.g., swiping the resource scrolling region via a touch-sensitive display with an input element, such as a finger). The selecting can be performed by interacting with the representations of the electronic resources or products in the resource scrolling region.

In some embodiments, the resource region may initially be hidden from display until the user inputs observation data into one or more of the answer elements. In other embodiments, the resource region may always be displayed, or may be hidden or displayed by selecting a corresponding expansion/contraction button (not shown). Any number of assessment regions and resource regions may be populated displayed. For example, there could be numerous standards and associated questions/indicators for measuring the product, and thus numerous corresponding resource regions for displaying electronic resources that correspond to the various assessments that have been made by the editor may be provided.

Figure 9:
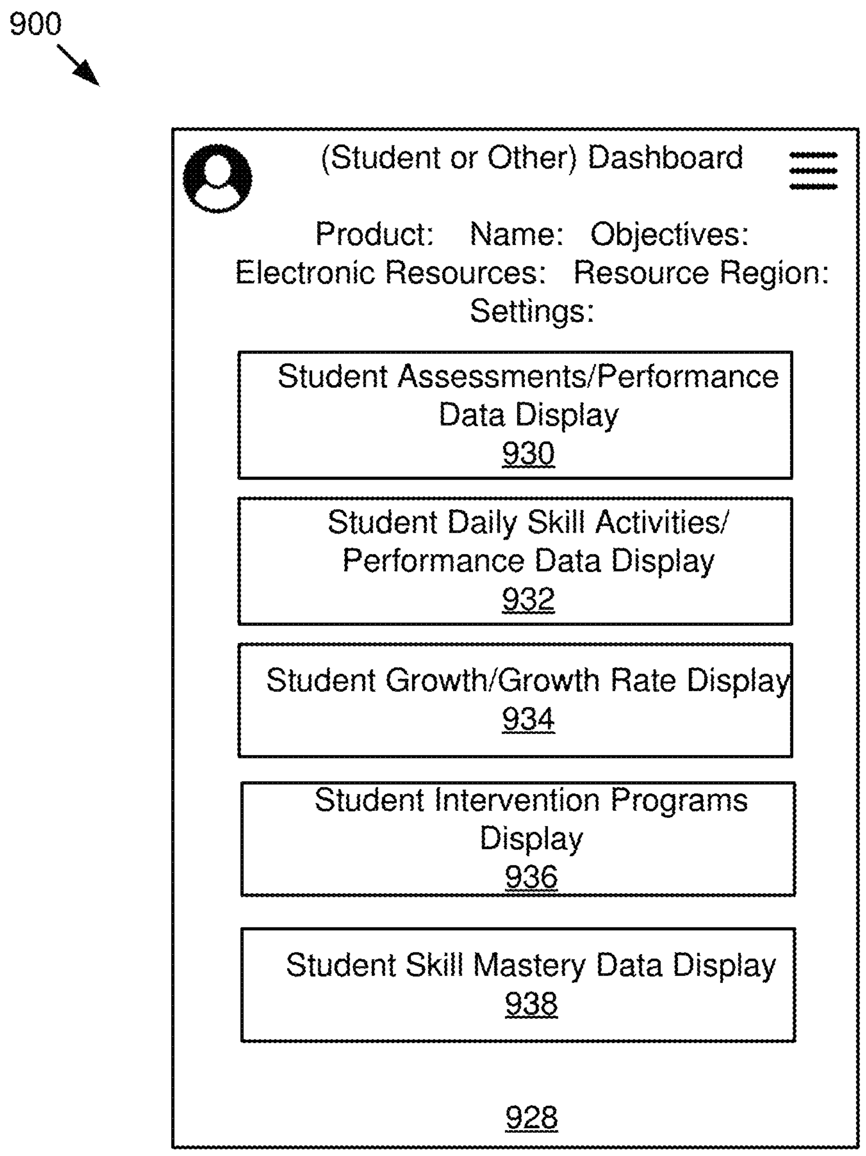
FIG. 9 is a graphical representation of a student dashboard.

Referring now to FIG. 9, an example display is illustrated generally by reference numeral 900. The graphical representation of an example dashboard 928 is illustrated. This dashboard may be used for a student or other and adapted to display data and metrics as described herein. The content alignment automation system generates the student dashboard for providing aligned content to a student user. The student user experience associated with the dashboard for growth management includes a convenient presentation of key assessment and performance indicators and status (e.g., growth rate, scores etc.) of the specific student user, educational content recommendations (e.g., as prescribed by student intervention programs etc.) for a specific status condition of the student user that is determined, student user education goals and to-do lists, in some instances skill planning and reminders, assessment appointment management, emotional and social support groups, etc. FIG. 9 shows an example graphical representation illustrating user interfaces for presenting a dashboard for performance and progress management to a user. The user interfaces as illustrated may be presented on a mobile application running on a client device, such as a mobile computing device. Although the user interfaces are illustrated in separate blocks, they may be scrolled through in sequence on a display of the mobile computing device. The dashboard for content management is designed to provide the student user with timely access to tools, educational resources, and intervention programs. The dashboard for content management is personalized to the student viewing the dashboard. In FIG. 9, the user interface 928 shows a first portion 930 for student assessments and performance that are personalized to a particular student's situation. In FIG. 9, the user interface 928 shows a second portion 932 for student daily skill activities designed for particular students. A third portion 934 is for displaying student growth and progress or student growth rates set by and/or for the student. In one example, one student might receive notifications of progress or reminders to undertake tasks toward progress, while another user may receive those notifications or reminders on another day, depending upon each student user's educational path. The notification or reminder may include a deep link that is selectable by the student user to view additional details, such as the links to additional materials or assessment dates etc. The notification may indicate to the student user to schedule an assessment date based on requirements met or outlined for the student user. In FIG. 9, the user interface 928 shows a fourth portion 936 detailing the student user's intervention programs (e.g., specific program activities or tasks to accelerate learning). The user interface 928 shows a fifth portion 938 for displaying student skill mastery to illustrate the student's level of learning and master of particular educational components.

An example system and methods for automatically aligning electronic content and products is described. In the above description, for purposes of explanation, numerous specific details are set forth in order to provide a thorough understanding of the present disclosure. It should be understood that the technology described in the various example embodiments can be practiced without these specific details. In other instances, structures and devices are shown in block diagram form in order to avoid obscuring the description.

Reference in the present disclosure to "some embodiments," "an embodiment," "an example embodiment," "other embodiments," etc., means that a particular feature, structure, or characteristic described in connection with the embodiment is included in at least one embodiment of the description. The appearances of the phrase "in some embodiments" in various places in the present disclosure are not necessarily all referring to the same embodiments.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms including, for example, "processing" or "computing" or "calculating" or "ranking" or "identifying" or "determining" or "displaying" or "receiving" or "conducting" or "collecting" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present embodiment of the present disclosure also relates to an apparatus for performing the operations herein. This apparatus may be specially constructed for the required purposes, or it may include a general-purpose computer selectively activated or reconfigured by a computer program stored in the computer. Such a computer program may be stored in a computer readable storage medium including, for example, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Certain parts of the present disclosure may take the form of an entirely hardware embodiment, an entirely software embodiment or an embodiment containing both hardware and software elements. In a preferred embodiment, the present disclosure is implemented in software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, wireless adapters, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description. In addition, the present disclosure is not described with reference to any particular programming language. It will be appreciated that a variety of programming languages may be used to implement the teachings of the present disclosure as described herein.

It is intended that the scope of the disclosure should not be limited by this particular detailed description. As will be understood by those familiar with the art, the present disclosure may be embodied in other specific forms without departing from the spirit or essential characteristics thereof. Likewise, the particular naming and division of the modules, routines, features, attributes, methodologies and other aspects are not mandatory or significant, and the mechanisms that implement the present disclosure or its features may have different names, divisions and/or formats. Furthermore, as will be apparent to one of ordinary skill in the relevant art, the modules, routines, features, attributes, methodologies and other aspects of the disclosure can be implemented as software, hardware, firmware or any combination of the three. Also, wherever a component, an example of which is a module, of the present disclosure is implemented as software, the component can be implemented as a standalone program, as part of a larger program, as a plurality of separate programs, as a statically or dynamically linked library, as a kernel loadable module, as a device driver, and/or in every and any other way. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A computer-implemented method comprising:

in a server, with one or more processors and a memory, using executable code stored in the memory to cause the one or more processors to execute control actions over a network to:

provide a user interface;

access, using the one or more processors at the server, over the network, a plurality of diverse content from a plurality of varied source servers coupled to the network;

align, using a knowledge graph, the plurality of diverse content in the user interface;

use one or more jurisdiction-dependent educational criteria stored in the memory as one or more content inputs to create one or more models;

assimilate a first content input from the one or more content inputs with one particular content dataset;

persist metadata associated with the one particular content dataset in a designated data storage;

add a second content input for performing a comparative algorithm to evaluate the first content input;

evaluate the first content input to determine if it produces an output that is at least one from a perfect text match and an imperfect text match, by executing an algorithm to perform one or more comparative operations in the user interface wherein, by the user interface, the one or more processors determine a student growth rate and a student skill mastery level for a particular student; and execute an algorithm to compare a plurality of education products with content created for different jurisdictions, including a question and an instruction plan.

2. The computer-implemented method according to claim 1, wherein the comparative operations comprise one or more of a one-to-one match function, a many-to-one match function, a one-to-many match function, and many-to-many match function.

3. The computer-implemented method according to claim 1, wherein the executable code stored in the memory further causes the one or more processors to execute a control action over a network to:

execute an algorithm to compare a plurality of education units of information and standards.

4. The computer-implemented method according to claim 1, wherein the plurality of education products includes multiple products comprising student assessment performance data, student daily skills practice data, student growth rate data, and student skill mastery data.

5. The computer-implemented method according to claim 1, wherein the executable code stored in the memory further causes the one or more processors to execute a control action over the network to:

provide an output in a user interface, wherein the user interface comprises a dashboard for display of one or more student assessments to determine a performance for a particular student.

6. The computer-implemented method according to claim 1, wherein the executable code stored in the memory further causes the one or more processors to execute a control action over a network to:

classify one or more output results from the models into at least one of likely matches and no matches.

7. The computer-implemented method according to claim 1, wherein the executable code stored in the memory further causes the one or more processors to execute a control action over a network to:

provide one or more output results in a user interface with one or more options for further input by an editor.

8. The computer-implemented method according to claim 1, wherein the executable code stored in the memory further causes the one or more processors to execute a control action over the network to:

provide an output in a user interface, wherein the user interface comprises a dashboard for display of one or more daily skill activities to determine performance data for a particular student.

9. The computer-implemented method according to claim 1, wherein the user interface comprises a student dashboard displaying at least one of student assessment performance, student daily skill activities, student growth rate, and student skill mastery.

10. The computer-implemented method according to claim 9, wherein the one or more processors designate a student intervention program to the particular student based on assessment of performance data of the particular student and the student growth rate of the particular student.

11. A system comprising:

a server, comprising one or more processors;

a memory coupled to the one or more processors, storing executable code configured to cause the one or more processors to execute control action over a network to:

provide a user interface;

access, over the network, a plurality of diverse content from a plurality of varied resource servers coupled to the network;

align, using a knowledge graph, the plurality of diverse content in the user interface;

use one or more jurisdiction-dependent educational criteria stored in the memory as content inputs to create one or more models;

assimilate a first content input with one content dataset;

persist metadata associated with the one content input in a designated data storage;

add a second content input for performing a comparative algorithm to evaluate the first content input;

evaluate the first content input to determine if the first content input is at least one of a perfect text match and an imperfect text match with the second content input, by executing an algorithm to perform one or more comparative operations in the user interface wherein, by the user interface, the one or more processors determine a student growth rate and a student skill mastery level for a particular student; and execute an algorithm to compare a plurality of education products with content created for different jurisdictions, including a question and an instruction plan.

12. The system according to claim 11, wherein the comparative operations comprise one or more of a one-to-one match function, a many-to-one match function, a one-to-many match function, and a many-to-many match function.

13. The system according to claim 11, wherein the executable code stored in the memory further causes the one or more processors to execute a control action over a network to:

execute an algorithm to compare a plurality of education units of information and standards.

14. The system according to claim 11, wherein the plurality of education products includes multiple products comprising student assessment performance data, student daily skills practice data, student growth rate data, and student skill mastery data.

15. The system according to claim 11, wherein the executable code stored in the memory further causes the one or more processors to execute a control action over the network to:

provide an output in a user interface, wherein the user interface comprises a dashboard for display of one or more student assessments to determine a performance for a particular student.

16. The system according to claim 11, wherein the executable code stored in the memory further causes the one or more processors to execute a control action over a network to:

classify one or more output results from the models into at least one of likely matches and no matches.

17. The system according to claim 11, wherein the executable code stored in the memory further causes the one or more processors to execute a control action over a network to:

provide one or more output results in a user interface with one or more options for further input by an editor.

18. The system according to claim 11, wherein the executable code stored in the memory further causes the one or more processors to execute a control action over the network to:

provide an output in a user interface, wherein the user interface comprises a dashboard for display of one or more daily skill activities to determine performance data for a particular student.

19. The system according to claim 11, wherein the user interface comprises a student dashboard displaying at least one of student assessment performance, student daily skill activities, student growth rate, and student skill mastery.

20. The system according to claim 19, wherein the one or more processors designate a student intervention program to the particular student based on assessment of performance data of the particular student and the student growth rate of the particular student.

* * * * *